US00RE37776E

(19) United States
(12) Reissued Patent
Foltz

(10) Patent Number: US RE37,776 E
(45) Date of Reissued Patent: Jul. 2, 2002

(54) CLOSURE ASSEMBLY FOR A TANK FILLER NECK

(75) Inventor: Dean C. Foltz, Shelbyville, IN (US)

(73) Assignee: Stant Manufacturing Inc., Connersville, IN (US)

(21) Appl. No.: 09/256,903

(22) Filed: Feb. 24, 1999

Related U.S. Patent Documents

Reissue of:
(64) Patent No.: 5,732,840
Issued: Mar. 31, 1998
Appl. No.: 08/426,239
Filed: Apr. 21, 1995

(51) Int. Cl.[7] ..... B65B 31/06; B65B 47/00; B65B 51/16

(52) U.S. Cl. ..... 220/86.2; 220/203.02; 220/203.1; 220/203.24; 220/203.28; 220/367.1; 141/59; 141/325; 141/348; 141/351

(58) Field of Search ..... 220/86.2, 86.3, 220/203.1, 203.27, 203.29, 254, 303, 304, 342, 343, 367.1, DIG. 33; 141/44, 45, 46, 59, 198, 301, 302, 304, 312, 325, 326, 348, 351, 354

(56) References Cited

U.S. PATENT DOCUMENTS

| | | | | |
|---|---|---|---|---|
| 3,477,611 | A | * | 11/1969 | Niles |
| 3,527,268 | A | * | 9/1970 | Ginsburgh |
| 3,642,036 | A | * | 2/1972 | Ginsburgh et al. |
| 3,820,680 | A | * | 6/1974 | Friend |
| 3,831,801 | A | * | 8/1974 | Rodgers |
| 3,911,977 | A | * | 10/1975 | Berger |
| 3,938,564 | A | * | 2/1976 | Jones |
| 4,000,633 | A | * | 1/1977 | Evans |
| 4,091,959 | A | | 5/1978 | O'Banion |
| 4,177,931 | A | * | 12/1979 | Evans |
| 4,280,346 | A | * | 7/1981 | Evans |
| 4,294,375 | A | * | 10/1981 | Gerdes |
| 4,312,649 | A | * | 1/1982 | Fujii et al. |
| 4,424,839 | A | * | 1/1984 | Otani et al. |

(List continued on next page.)

FOREIGN PATENT DOCUMENTS

| | | | |
|---|---|---|---|
| CA | 2102645 | * | 5/1994 |
| DE | 4218287 A1 | * | 12/1993 |
| DE | 4242243 A1 | * | 6/1994 |
| DE | 4243883 A1 | * | 6/1994 |
| EP | 0265829 | * | 5/1988 |
| WO | WO 94/05592 | | 3/1994 |

*Primary Examiner*—Steven O. Douglas
(74) *Attorney, Agent, or Firm*—Barnes & Thornburg

(57) ABSTRACT

A filler neck closure assembly for a vehicle fuel tank filler neck, comprising: a housing configured to be mounted in the filler neck and formed to include a sealing surface and a pressure-relief valve positioned to lie in the housing and provided with a nozzle-receiving portion and a sealing portion, wherein the nozzle-receiving portion is formed to include a nozzle-receiving opening sized to receive a pump nozzle during refueling of the fuel tank and the sealing portion is movable with the nozzle portion and relative to the housing between a closure-sealing position sealingly engaging the sealing surface and a pressure-relief position away from the sealing surface to define an opening to vent fuel vapor from the fuel tank when tank pressure exceeds a predetermined maximum pressure. The housing is formed to include a passageway containing the pressure-relief valve therein and defines an annular space around the pressure-relief valve, between the pressure-relief valve and the housing, and with a coiled compression spring positioned in the annular space, the pressure-relief valve including an axially outwardly extending annular guide wall adjacent to the annular space which defines a radially inner side of the annular space, the housing further including a radially inwardly extending annular lip wherein the guide wall slidingly engages the lip of the housing to radially guide the pressure-relief valve during movement of the pressure-relief valve between the closure-sealing position and the pressure-relief position.

80 Claims, 12 Drawing Sheets

U.S. PATENT DOCUMENTS 4,498,493 A * 2/1985 Harris
4,651,889 A * 3/1987 Uranishi et al.
4,676,390 A * 6/1987 Harris
4,678,097 A * 7/1987 Crute
4,702,386 A * 10/1987 Boehmer et al.
4,714,172 A * 12/1987 Morris
4,741,369 A * 5/1988 Dawson
4,747,508 A * 5/1988 Sherwood
4,762,247 A * 8/1988 Temmesfeld
4,765,504 A * 8/1988 Sherwood et al.
4,765,505 A * 8/1988 Harris
4,816,045 A * 3/1989 Sziaga et al.
4,881,578 A * 11/1989 Rich et al.
4,883,103 A * 11/1989 Sziaga et al.
4,946,060 A * 8/1990 Sherwood et al.
4,966,299 A * 10/1990 Teets et al.
4,986,439 A 1/1991 Ott et al.
5,042,678 A 8/1991 Munguia
5,056,570 A * 10/1991 Harris et al.
5,110,003 A * 5/1992 MacWilliams
5,195,566 A 3/1993 Ott et al.
5,234,039 A 8/1993 Aoshima et al.
5,238,034 A 8/1993 Corfitsen
5,242,075 A * 9/1993 Ott et al.
5,271,438 A * 12/1993 Griffin et al.
5,322,100 A 6/1994 Buechler et al.
5,393,195 A * 2/1995 Corfitsen
5,449,086 A 9/1995 Harris
5,509,569 A * 4/1996 Hiranuma et al.
5,547,099 A 8/1996 Chang
5,720,328 A 2/1998 Ott

* cited by examiner

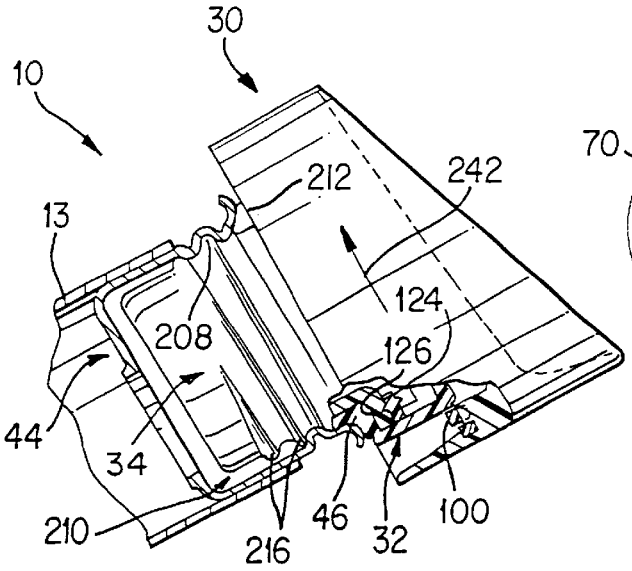
FIG. 9
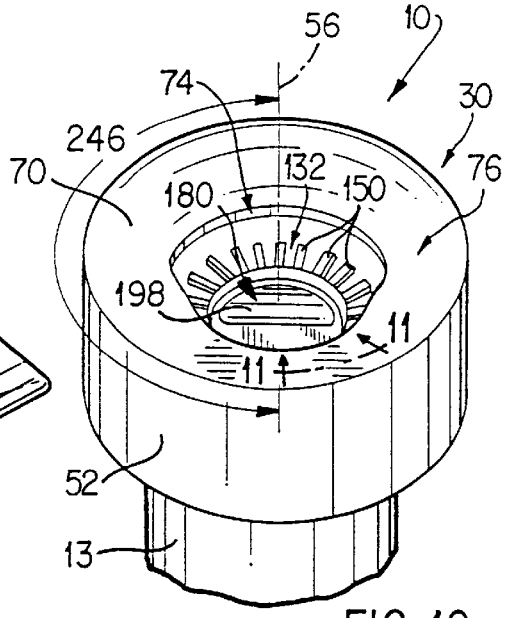
FIG. 10
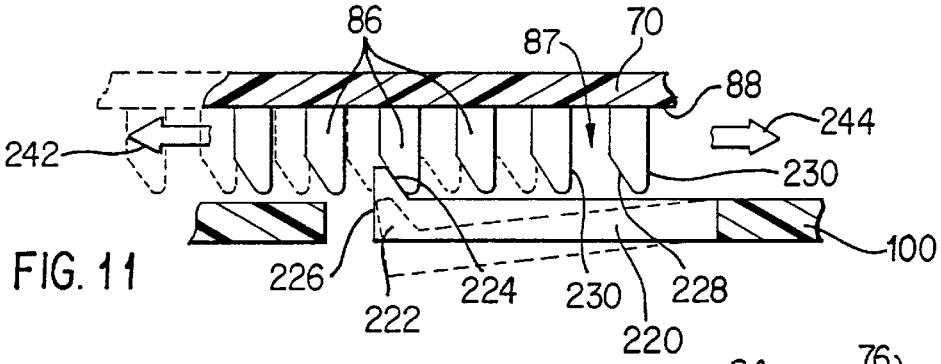
FIG. 11
FIG. 12
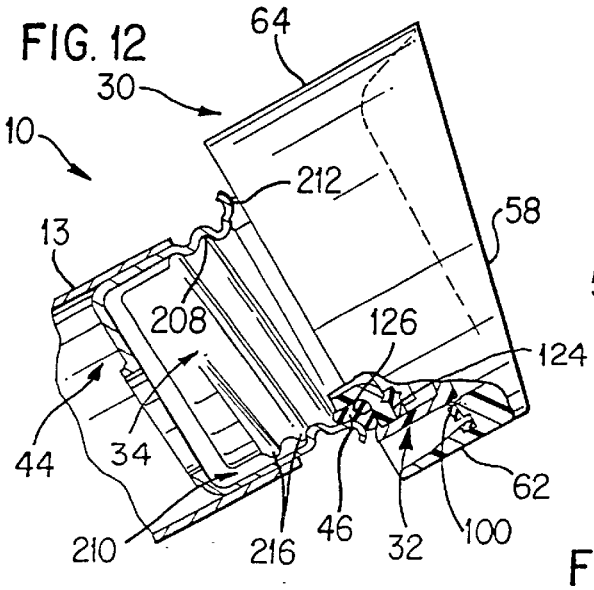
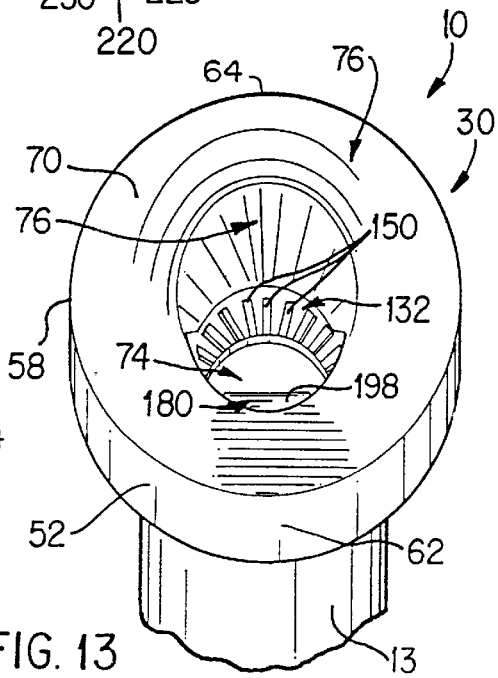
FIG. 13

CLOSURE ASSEMBLY FOR A TANK FILLER NECK

Matter enclosed in heavy brackets [ ] appears in the original patent but forms no part of this reissue specification; matter printed in italics indicates the additions made by reissue.

BACKGROUND AND SUMMARY OF THE INVENTION

The present invention relates to a closure assembly for a tank filler neck, and particularly to a capless closure assembly for a vehicle fuel tank filler neck that operates to close the filler neck automatically as soon as a fuel-dispensing pump nozzle is removed from the filler neck following refueling of the tank. More particularly, the present invention relates to a filler neck closure assembly that cooperates with a fuel-dispensing pump nozzle, which may be connected to a robotic refueling system, to provide an automatic opening and closing mechanism for the filler neck and that functions automatically to vent excess tank pressure and relieve unwanted tank vacuum after refueling is completed.

A removable fuel cap with a sealing gasket is typically used to close the open end of a fuel tank filler neck. After an attendant fills the fuel tank and withdraws the pump nozzle from the filler neck, the fuel cap is attached to the filler neck so that the sealing gasket forms a seal between the fuel cap and the filler neck. Thus, the fuel cap closes the open end of the filler neck to block discharge of liquid fuel and fuel vapor from the fuel tank through the filler neck. Additionally, some fuel caps are provided with pressure-relief and vacuum-relief valves to permit some controlled venting of fuel vapors in the filler neck while the fuel cap is mounted on the filler neck.

It has been observed that fuel caps are often lost or damaged over time and, as a result, the open end of the filler neck might not be closed and sealed in accordance with original equipment specifications during operations of the vehicle. Accordingly, a filler neck configured to "open" automatically as a fuel-dispensing pump nozzle is inserted into the filler neck during refueling and "close" automatically once the pump nozzle is withdrawn from the filler neck without requiring an attendant to reattach a fuel cap to the filler neck would be an improvement over many conventional capped filler neck systems. [.Although]*Although* conventional fuel caps function to close filler necks in a satisfactory manner, it is thought that a capless filler neck could make vehicle refueling more convenient for consumers because no action other than inserting a pump nozzle into the outer end of the filler neck would be required to begin refueling a vehicle. Advantageously, such a capless filler neck system would be configured in accordance with the present invention to include a liquid fuel and fuel vapor control apparatus.

Filler necks with self-closing closure mechanisms are known in the art. See, for example, U.S. Pat. Nos. 3,938,564 to Jones: 5,056,570 to Harris et al.: and 5,271,438 to Griffin et al. In addition, U.S. Pat. Nos. 5,195,566 to Ott et al.: 4,986,439 to Ott et al.: 4,702,839 to Boehmer et al.: and 4,424,839 to Otani et al., and German document Nos. DE 42 18 287 A1 to Ott and DE 42 43 883 A1 to Soutter all disclose self-closing caps.

A robotic refueling system operates to detect a vehicle arriving at a vehicle-refueling station, locate a fuel tank filler neck in the vehicle, and move a fuel-dispensing pump nozzle automatically into and out of the filler neck at the proper times so that the fuel tank on board the vehicle can be filled with fuel without any manual movement or operation of the pump nozzle by an attendant. For example, U.S. Pat. Nos. 5,238,034 to Corfitsen: 3,642,036 to Ginsburgh, and 3,527,268 to Ginsburgh: as well as German document No. DE 42 42 243 A1 to Hagele all disclose automatic fueling systems for vehicles provided with filler neck closures suited for use with such systems.

A capless filler neck closure that is configured to control air, vapor, and liquid flow into and out of a fuel tank filler neck and is compatible with robotic refueling systems, yet is configured to be assembled quickly and easily using a minimal number of parts would be an improvement over known filler neck closures. An inexpensive yet effective capless filler neck closure that is reliable, easy to manufacture, and easy to install is needed. This need is expected to grow once robotic refueling systems become widely available. A capless filler neck closure that is configured to open automatically in response to engagement with a moving pump nozzle regardless of whether the pump nozzle is moved manually by an attendant or robotically by a robotic refueling system, and to close automatically after refueling is completed, and that is configured to relieve unwanted excess pressure and vacuum conditions in the tank automatically any time that such conditions develop and the filler neck is closed, would be welcomed by many vehicle manufacturers, vehicle owners, and service station operators.

According to the present invention, a filler neck closure assembly is provided for a vehicle fuel tank filler neck. The filler neck closure assembly includes a housing configured to mount in the filler neck and formed to include a sealing surface. A pressure-relief valve is mounted for movement in the housing and formed to include a nozzle-receiving portion and a sealing portion. The nozzle-receiving portion is formed to include an inner nozzle-receiving opening that receives a pump nozzle during refueling of the fuel tank. The sealing portion normally engages the sealing surface formed in the housing.

The sealing portion of the pressure-relief valve is movable relative to the housing between a closure-sealing position and a pressure-relief position in response to changing pressure conditions in the filler neck so as to relieve excess fuel vapor pressure that develops from time to time in the filler neck. Normally, the filler neck pressure is below a predetermined maximum pressure and the sealing portion of the pressure-relief valve is retained in the closure-sealing position sealingly engaging the sealing surface to block discharge of liquid fuel and fuel vapor from the filler neck to the atmosphere past the pressure-relief valve. However, when filler neck pressure exceeds the predetermined maximum pressure, the sealing portion is moved by such high pressure away from the sealing surface in the housing to the pressure-relief position to define a venting opening between the housing and the pressure-relief valve. This allows pressurized fuel vapor to vent from the fuel tank to the atmosphere through the vent opening.

The pressure-relief valve is configured so that the nozzle-receiving portion formed therein moves along with the sealing portion formed therein when the sealing portion moves between the closure-sealing position and the nozzle-receiving position to vent pressurized fuel vapor from the filler neck to the atmosphere. Illustratively, the sealing portion is arranged to surround the nozzle-receiving portion.

In preferred embodiments, the filler neck closure assembly is installed in the filler neck of a vehicle fuel tank. The filler neck closure assembly is a "capless system" because it does not include a traditional fuel cap that is separate and removable from the filler neck. Significantly, the filler neck closure assembly is configured to allow an attendant or a robotic mechanism to insert a fuel-dispensing pump nozzle into the filler neck during refueling of the fuel tank without first removing a separate fuel cap from the mouth of the filler neck. In addition, after refueling is completed and the pump nozzle is withdrawn, the closure assembly automatically closes the filler neck so that it is unnecessary for an attendant or a robotic mechanism to install a separate fuel cap on the filler neck to close the mouth of the filler neck.

Vehicles having fuel tanks are often operated in environments in which fuel in the fuel tank experiences temperature fluctuations resulting in fuel vapor pressure fluctuations in the fuel tank. The pressure-relief valve is mounted in the housing to relieve unwanted fuel vapor pressure in the fuel tank in excess of a predetermined maximum pressure that can develop, for example, during operation of a vehicle in hot environments.

Illustratively, the pressure-relief valve in accordance with the present invention is a slidable, spring-loaded disk mounted at an outer end of the filler neck adjacent to the mouth of the filler neck. In addition, a vacuum-relief valve is provided in the housing to relieve unwanted vacuum in the fuel tank. The vacuum-relief valve functions to admit air from the atmosphere into the filler neck so as to increase tank pressure when tank pressure is less than a predetermined minimum pressure. Vacuum conditions can develop in a fuel tank during the cool-down of a vehicle that can occur, for example, at night. Illustratively, the vacuum-relief valve is a spring-loaded valve pivotably mounted on the pressure-relief valve.

The pressure-relief valve is formed to include a central opening that is normally closed by the pivotable spring-loaded vacuum-relief valve mounted on the pressure-relief valve. During refueling, an attendant or robotic mechanism passes a pump nozzle through the central opening formed in the pressure-relief valve and pivots the vacuum-relief valve to an opened position so that the pump nozzle can be used to discharge liquid fuel into the fuel tank filler neck without disrupting the position and filler-neck closing function of the pressure-relief valve. Normally, the sealing portion of the pressure-relief valve is urged by a spring to its closure-sealing position closing the filler neck during refueling. Advantageously, the pump nozzle can pass through the central opening formed in the nozzle-receiving portion of the pressure-relief valve without disturbing or moving the surrounding sealing portion of the pressure-relief valve.

During fuel tank cool-down, excessive vacuum in the fuel tank and filler neck creates a suction force in the filler neck sufficient to pivot the spring-loaded vacuum-relief valve away from is seat against the pressure-relief valve to an opened position. Such automatic "opening" of the vacuum-relief valve functions to allow a flow of air from the atmosphere into the fuel tank filler neck through the central opening formed in the pressure-relief valve, thereby relieving the unwanted low tank and filler neck pressure automatically. This inflow of atmospheric air can occur even though the pressure-relief valve remains in a filler neck-closing position.

In preferred embodiments, the closure assembly includes an outer shell connected to the housing and positioned to lie adjacent to an outer side of the slidable spring-loaded pressure-relief valve. The outer shell has a front wall that defines a nozzle-guiding surface and that is formed to include a nozzle-receiving opening in fluid communication with the central opening formed in the adjacent pressure-relief valve. The front wall is generally funnel-shaped so that a pump nozzle engaging the nozzle-guiding surface defined by front wall and advancing into the closure assembly during refueling of the fuel tank is guided radially inwardly toward the nozzle-receiving opening formed in the outer shell. Advantageously, the nozzle-guiding surface on the front wall is helpful both to attendants manually guiding pump nozzles into the closure assembly and to robotic refueling systems automatically guiding pump nozzles into the closure assembly. In addition, the front wall provides a seating surface to accommodate fuel vapor recovery nozzle assemblies that include external fuel vapor recovery boots.

The closure assembly is easily installed into the filler neck of the fuel tank at the time of vehicle manufacture or repair. The installer simply grasps the outer shell of the closure assembly and places a threaded inner end of the housing into engagement with the threaded filler neck. Rotation of the outer shell by the installer in a clockwise closure-advancing direction brings the threads on the housing into interlocking engagement with the threads in the filler neck. Continued rotation of the outer shell causes the outer shell and the housing unit to be drawn into the filler neck. Once the housing is properly seated in the filler neck, the outer shell can be rotated or indexed relative to the seated housing to assume a corrected installation orientation and position on the filler neck.

An annular sealing gasket is provided on an outer portion of the housing. As the installer rotates the outer shell and housing unit in the closure-advancing direction, the closure assembly advances to a tight seated position in the filler neck in which the sealing gasket is trapped between the filler neck and the housing to establish a liquid fuel and fuel vapor seal therebetween.

Advantageously, the closure assembly is designed and constructed to protect the sealing gasket from damage that might be caused by over tightening the housing in the filler neck. The closure assembly is configured to divert excessive closure-advancing torque that an installer might apply to the outer shell away from the housing and the sealing gasket.

The torque-limiting mechanism interposed between the outer shell and the housing allows torque applied to the outer shell below a predetermined maximum torque to be transmitted from the outer shell to the housing and torque applied to the outer shell above the predetermined maximum torque to be diverted away from the housing and the sealing gasket trapped between the housing and the filler neck. The torque-limiting mechanism causes the outer shell to rotate independently of the housing when the torque applied to the outer shell exceeds the predetermined maximum torque, for example, when the installer continues to rotate the outer shell after the closure assembly has advanced to the tight seated position in the filler neck, rather than transmitting the torque from the outer shell to the housing. The independent rotation of the outer shell relative to the housing protects the sealing gasket while also permitting the installer to orient the outer shell in a proper radial installation position relative to the filler neck without affecting or damaging the seal formed between the filler neck and the housing.

Advantageously, the radial orientation of the central opening of the pressure-relief valve relative to the outer shell is fixed by a spline appended to the pressure-relief valve and mounted in an opening of the outer shell. The spline cooperates with the outer shell to radially fix the pressure-relief valve relative to the outer shell and to cause the pressure-relief valve to rotate relative to the housing in response to rotation of the outer shell relative to the housing when the outer shell is rotated or indexed to assume the corrected installation orientation and position on the filler neck.

Additionally, a frangible connection between the outer shell and the housing is designed and configured to enhance and control breakage of the closure assembly between the outer shell and the housing in a manner that is designed to leave the filler neck closed during an impact to the closure assembly. A flange that connects the housing and the outer shell has a frangible section to enhance breakage of the flange relative to the housing. The closure assembly is configured so that the filler neck will remain closed after the separation of the outer shell and the flange from the housing.

Also in preferred embodiments, various components of the closure assembly are decorated with selected codes, adornments, and/or patterns to facilitate detection of the filler neck and closure assembly. For example, the outer shell and a flapper door included in the vacuum-relief valve can cooperate to provide information useful for visual detection of the location of the filler neck and closure assembly. The outer shell can be made from a material having a light color and the flapper door can be made from a material having a dark color. Together, the outer shell and flapper door, which includes a flat plate that is visible behind the nozzle-receiving opening, can present a "bulls-eye" pattern that is easily recognizable by an attendant guiding a pump nozzle into the closure assembly.

Some robotic refueling systems use a filler neck detection system to locate the filler neck for the robotic refueling system prior to docking the pump nozzle in the closure assembly. In these instances, codes, adornments, and/or patterns of the type described can provide docking verification information that can be used by the robotic refueling system.

Additional objects, features, and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which:

FIGS. 9–13 show the outer shell of the closure assembly of FIG. 2 in various positions as it is rotated relative to the filler neck toward a preferred orientation position after the installation of the housing and the base into the filler neck;

FIG. 9 is a side elevation view of the closure assembly of FIG. 4 after advancing the closure assembly into the base by rotating the outer shell so that both a lip on the base and a lip on the closure assembly sealingly trap the O-ring seal therebetween but before the outer shell is rotated relative to the filler neck to a preferred orientation;

FIG. 10 is a front elevation view of the closure assembly of FIG. 9;

FIG. 11 is an enlarged sectional view taken along line 11—11 of FIG. 10 showing a torque-override connection mechanism including drive teeth appended to a bottom side of the outer shell and a flexible finger appended to the housing, the finger having a driven tooth in engagement with the drive teeth;

FIG. 12 is a side elevation view similar to FIG. 9 showing the outer shell after it has been rotated about its axis of rotation relative to the housing to its preferred orientation;

FIG. 13 is a front elevation view of the closure assembly of FIG. 12;

FIG. 14 is a view similar to FIG. 4 of the second embodiment of a filler neck closure showing the annular valve seat for a spring-loaded, pivotable vacuum-relief valve inserted into the nozzle-receiving opening formed in the slidable pressure-relief valve and the sleeve inserted into the nozzle-receiving opening and arranged to secure the valve seat in the nozzle-receiving opening;

FIG. 15 is a view similar to FIG. 14 showing the slidable pressure-relief valve after it has been moved in an axially outward direction to a pressure-relief position due to the presence of superatmospheric fuel vapor pressure in the filler neck, thereby permitting the flow of pressurized fuel vapor from a vehicle fuel tank through the filler neck and closure assembly to the atmosphere;

FIG. 16 is a view similar to FIG. 15 showing a spring-loaded, pivotable flapper door in the vacuum-relief valve after it has been pivoted in the closure assembly to a vacuum-relief position due to the presence of subatmospheric fuel vapor pressure in the filler neck, thereby permitting the flow of ambient air from the atmosphere into the vehicle fuel tank through the closure assembly and filler neck;

DETAILED DESCRIPTION OF THE DRAWINGS

Figure 1:
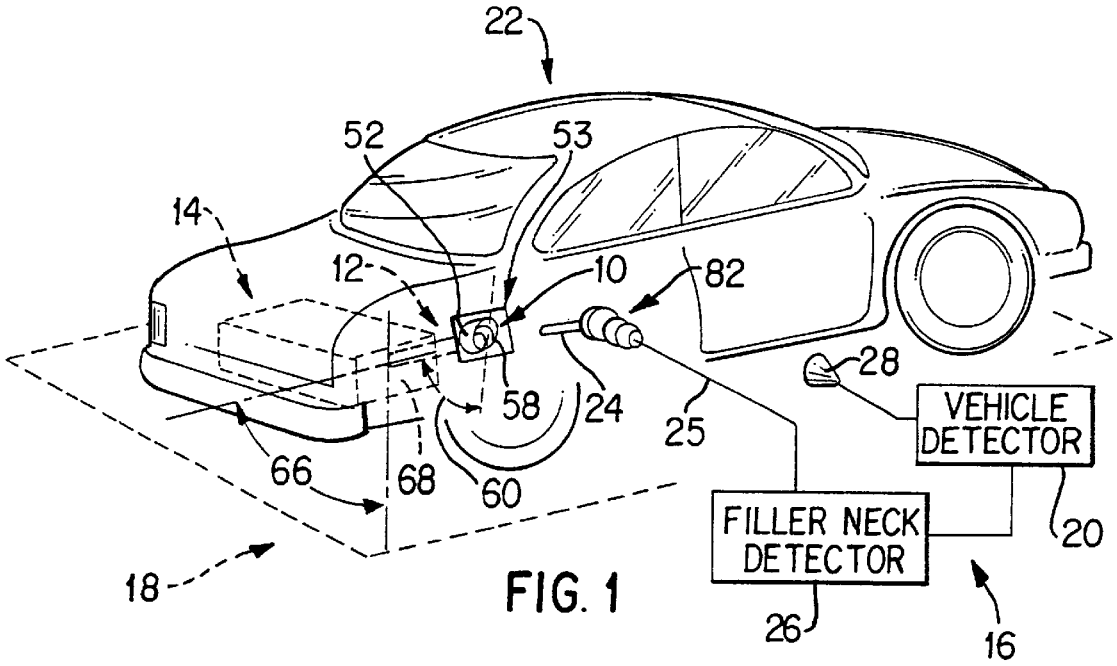
FIG. 1 is a perspective view of a vehicle including a fuel tank filler neck closure assembly in accordance with the present invention and a diagrammatic illustration of a robotic refueling system including a refueling zone containing the vehicle a vehicle detector, a filler neck detector, and a robotically-controlled pump nozzle connected to the filler neck detector.

A closure assembly 10 in accordance with the present invention for a filler neck 12 of a vehicle fuel tank 14 is compatible for use both when vehicle fuel tank 14 is refueled by an attendant (not shown) and when vehicle fuel tank 14 is refueled using a robotic refueling system 16 (shown diagrammatically in FIG. 1). In addition, closure assembly 10 functions to vent excess fuel vapor pressure from vehicle fuel tank 14 when tank pressure is too high and allow air into vehicle fuel tank 14 when tank pressure is too low.

Illustrative robotic refueling system 16 is operable within a refueling zone 18 illustratively shown by an area indicated by dashed lines in FIG. 1. When a vehicle 22 enter refueling zone 18 for refueling, a vehicle detector 20 having an external nozzle-positioning sensor 28 determines the position of vehicle 22 within refueling zone 18. Vehicle detector 20 also determines the approximate location of closure assembly 10.

Figure 2:
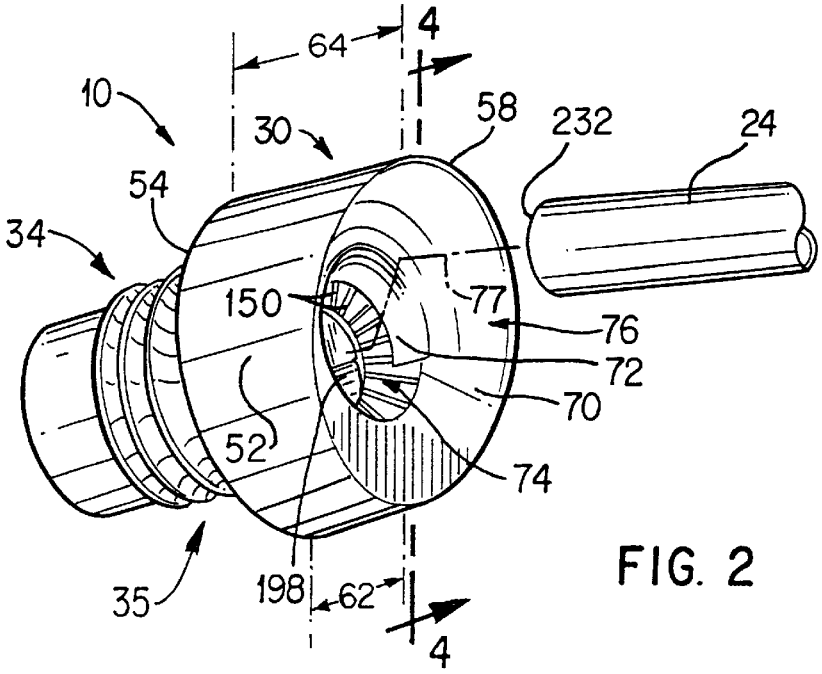
FIG. 2 is a perspective view of the fuel tank filler neck closure assembly of FIG. 1 showing an outwardly-facing nozzle-guiding surface of the closure assembly having a pump nozzle-receiving opening, a pump nozzle moving toward the nozzle-guiding surface, and the expected path (represented by a dotted line) of a tip of the pump nozzle on the nozzle-guiding surface toward and into the nozzle-receiving opening formed in the closure assembly.

Once robotic refueling system 16 determines the approximate location of closure assembly 10, a pump nozzle assembly 82 appended to a pump nozzle conveyor 25 advances to the approximate location of closure assembly 10 as shown in FIG. 2. A filler neck detector 26 for determining a more precise position of closure assembly 10 may be included with robotic refueling system 16. Once the position of closure assembly 10 is established, pump nozzle conveyor 25 advances pump nozzle assembly 82 toward closure assembly 10 so that a pump nozzle 24 can penetrate closure assembly 10 and refuel vehicle fuel tank 14. Closure assembly 10 is shown in more detail in FIGS. 3 and 4.

Figure 3:
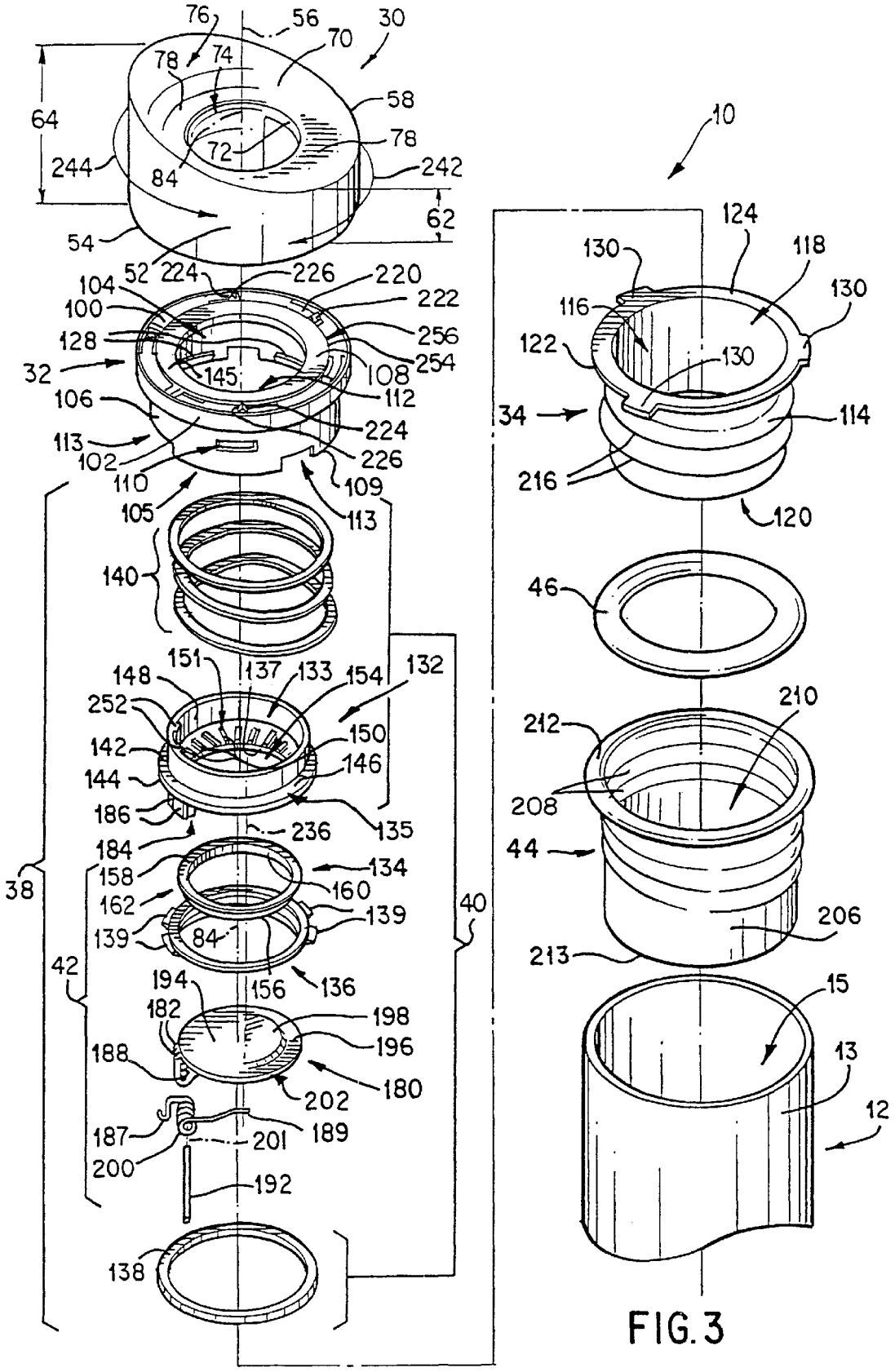
FIG. 3 is an exploded perspective view of the closure assembly of FIG. 1 showing an outer shell including the nozzle-guiding surface, a housing including an annular outer body that is connectable to the outer shell, a threaded inner body that is connectable to the outer body, a base sized to receive the inner body and fit into an outer end of a filler neck, an O-ring seal between the inner body and the base, and various components that can be arranged inside the housing to define a spring-loaded, annular, slidable pressure-relief valve and a spring-loaded, pivotable vacuum-relief valve in the closure assembly.

An exploded perspective view of closure assembly 10 of FIG. 2 is provided in FIG. 3 to illustrate a preferred embodiment showing the various components of the closure assembly 10. An outer shell 30 including a funnel-shaped front wall 70 arranged to define an outer nozzle-receiving opening 74 is mounted on outer body 32. Outer body 32 is connected to inner body 34. The outer and inner bodies 32, 34 cooperate to define a housing 35 having an internal valve-receiving space 26 as shown best in FIG. 4. Inner body 34 is received by a base 44 that fits into a filler neck 12 and a sealing gasket or sealing member 46 is positioned between inner body 34 and base 44 to sealingly engage both inner body 34 and base 44 thereby blocking the flow of fuel vapor or ambient air therebetween.

It will be understood that the pressure in fuel tank 14 could increase or decrease after filling due to changes, for example, in fuel temperature. As shown best in FIG. 3, a tank pressure control subassembly 38 includes a pressure-relief valve subassembly 40 and a vacuum-relief valve subassembly 42. Tank pressure control subassembly 38 is received in valve-receiving space 36 and configured to maintain the tank and filler neck pressure in a range between a predetermined minimum pressure and a predetermined maximum pressure.

Pressure-relief valve subassembly 40 includes a closure portion including a seal plate 132 having a nozzle-receiving portion 133 and a sealing portion 135. Seal plate 132 is biased inwardly by a compression spring or coiled compression spring 140 so that sealing portion 135 sealingly engages an O-ring or annular seal or O-ring seal 138. O-ring 138 is trapped between inner body 34 and sealing portion 135 to establish a seal therebetween so that pressure-relief valve subassembly 40. O-ring 138, and inner body 34 cooperate to block the flow of air into fuel tank 14 and the flow of liquid fuel and fuel vapor out of fuel tank 14 between sealing portion 135 and inner body 34 when the tank pressure is below the predetermined maximum tank pressure.

Figures 4, 4A:
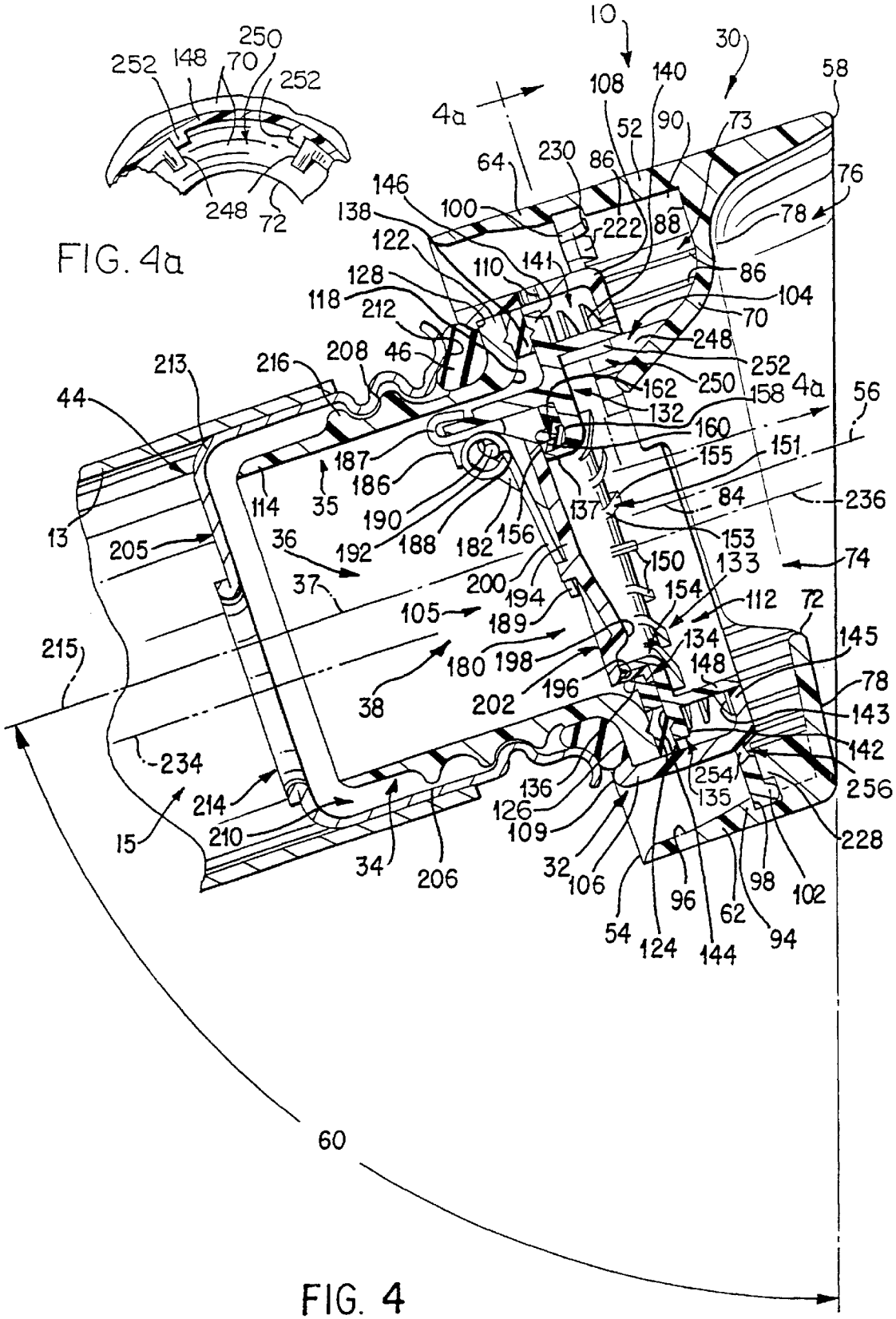
FIG. 4 is a sectional view taken along line 4—4 of FIG. 2 showing the slidable pressure-relief valve and the pivotable vacuum-relief valve in their closed non-venting positions.
FIG. 4a is a partial sectional view of the spline and drive teeth shown at right angles to their locations in FIGS. 4.
Figure 7:
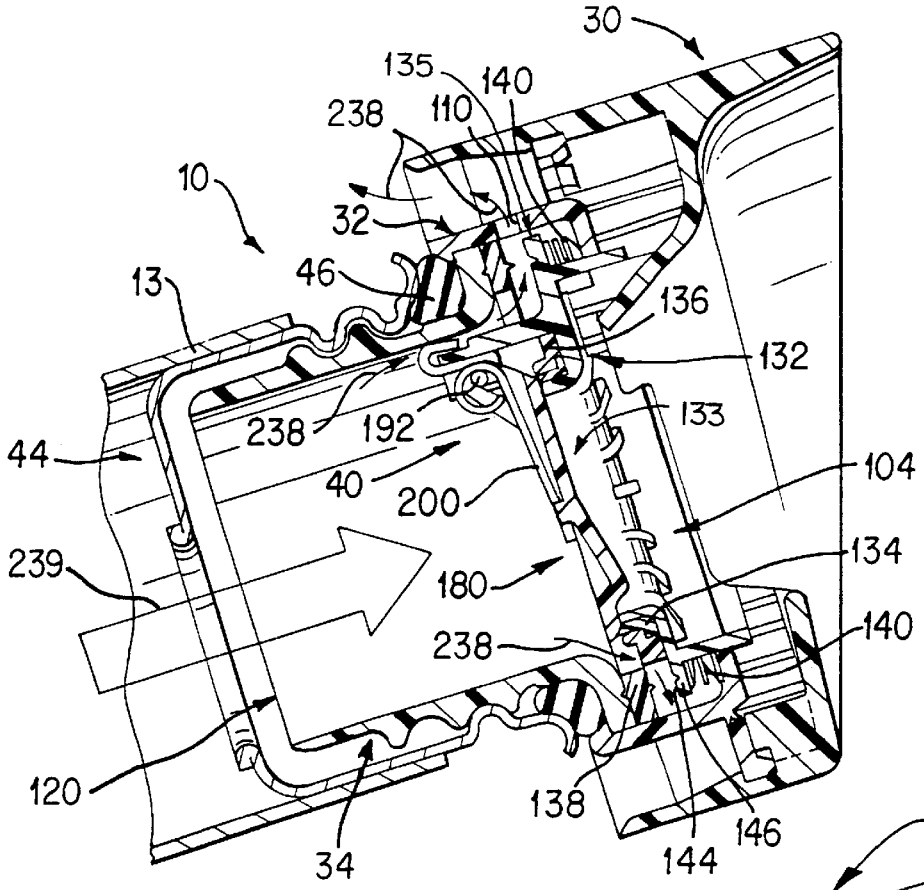
FIG. 7 is a view of the closure assembly of FIG. 4 showing the slidable pressure-relief valve after it has been moved in an axially outward direction in the closure assembly to a pressure-relief position due to the presence of superatmospheric fuel vapor pressure in the filler neck, thereby permitting the flow of pressurized fuel vapor from a vehicle fuel tank through the filler neck and closure assembly to the atmosphere.

Sealing portion 135 of pressure-relief valve subassembly 40 is movable relative to housing 35 and causes nozzle-receiving portion 133 to move along with sealing or filler neck-closing or closed portion 135 between an axially inward closure-sealing position shown in FIG. 4 sealingly engaging O-ring 138 and an axially outward pressure-relief or filler neck-venting or open position shown in FIG. 7 away from O-ring 138 to define an opening therebetween to vent fuel vapor from fuel tank 14 when tank pressure exceeds the predetermined maximum pressure. Nozzle-receiving portion 133 is formed to include an inner nozzle-receiving opening or aperture 154 formed to receive the pump nozzle 24 during refueling of fuel tank 14.

An axially inwardly extending upstanding annular seal-receiving wall 137 is appended to seal plate 132 adjacent to inner nozzle-receiving opening 154 as shown in FIGS. 3 and 4. Vacuum-relief valve subassembly 42 includes an annular valve seat 134 mounted on seal-receiving wall 137 and an annular door seal retainer 136 engages annular valve seat 134 to retain annular valve seat 134 against seal-receiving wall 137. Vacuum-relief valve subassembly 42 further includes a flapper door 180 that is pivotably appended to seal plate 132 of pressure-relief valve subassembly 40. It should be understood that vacuum-relief valve subassembly 42 moves with seal plate 132 as the pressure-relief valve subassembly 40 moves between the pressure-relief position shown in FIG. 7 and the closure-sealing position shown in FIG. 4.

As shown in FIG. 4, flapper door 180 of vacuum-relief subassembly 42 is biased axially outwardly by torsion spring 200 to a sealing position sealingly engaging seal plate 132 to block the flow of air through the inner nozzle-receiving opening 154 when tank pressure is above the predetermined minimum tank pressure. Flapper door 180 is drawn inwardly away from the sealing position when the tank pressure is below the predetermined minimum pressure to pivot to a vacuum-relief or open position shown in FIG. 8 away from seal plate 132 to form an opening therebetween thereby allowing the flow of air through inner nozzle-receiving opening 154 to fuel tank 14 to relieve subatmospheric tank pressure. It can be seen, then, that vacuum-relief valve subassembly 42 is movable relative to pressure-relief valve subassembly 40 between the vacuum-relief position shown in FIG. 8 and the sealing position shown in FIG. 4. It can also be seen that tank pressure control subassembly 38 operates to maintain the tank pressure in a predetermined range between the predetermined minimum pressure and the predetermined maximum pressure.

Figure 5:
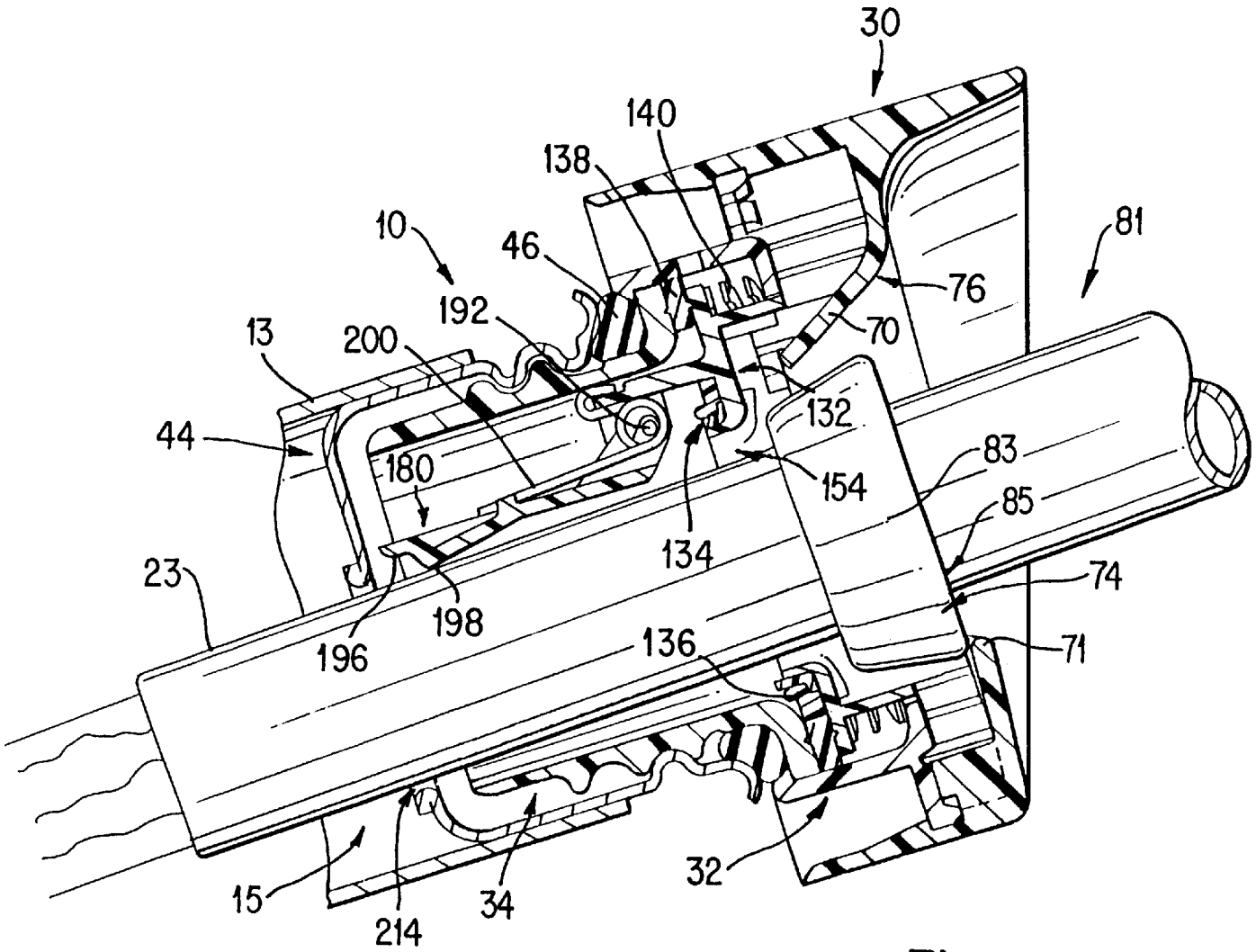
FIG. 5 is a view of the closure assembly of FIG. 4 showing a pump nozzle passing through the nozzle-receiving opening formed in the outer shell, holding a pivotable spring-biased flapper door in a fully opened position, and dispensing liquid fuel into a fuel tank filler neck.
Figure 6:
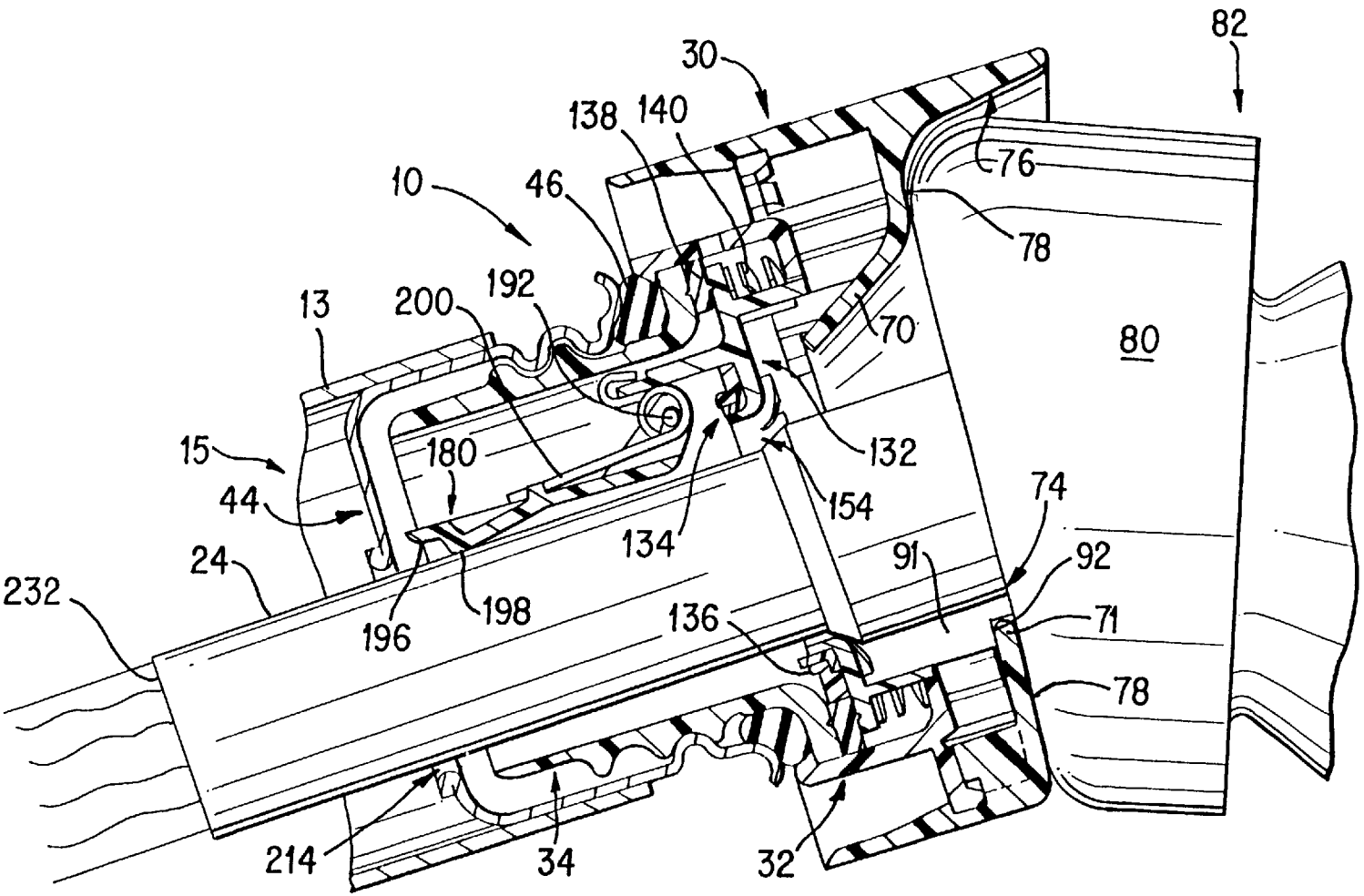
FIG. 6 is a view similar to FIG. 5 showing another type of pump nozzle passing through the nozzle-receiving opening formed in the outer shell and dispensing liquid fuel into the fuel tank filler neck, this pump nozzle carrying a fuel vapor recovery boot that is arranged to seat against a boot-seating surface on the outer shell when the pump nozzle is inserted into the filler neck during refueling of the fuel tank.

In addition to providing a path for the flow of ambient air through filler neck 12 and into vehicle fuel tank 14, inner nozzle-receiving opening 154 also receives pump nozzle 24 of vapor recovery nozzle assembly 82 as shown in FIG. 6 or a pump nozzle 23 of a standard nozzle assembly 81 as shown in FIG. 5 during refueling. The coaction between closure assembly 10 and pump nozzle 23 is substantially similar to the coaction between closure assembly 10 and pump nozzle 24. All descriptions of the coaction of both pump nozzles 23. 24 with closure assembly 10 below are presented with respect to pump nozzle 24 of vapor recovery nozzle assembly 82 unless specifically stated otherwise.

Pump nozzle 24 engages flapper door 180 when pump nozzle 24 advances into closure assembly 10 and acts against torsion spring 200 to move flapper door 180 to a fully open position shown in FIG. 6 during refueling. In this manner, vacuum-relief valve subassembly 42 cooperates with inner nozzle-receiving opening 154 both to relieve subatmospheric tank pressure below a predetermined minimum pressure and to allow ingress of pump nozzle 24 into filler neck 12 during refueling.

Pump nozzle 24 can engage out shell 30 when moving to penetrate closure assembly 10. Outer shell 30 includes a cylindrical side wall 52 that is formed in the shape of a truncated right circular cylinder as shown in FIGS. 2–4. An inner edge 54 of cylindrical side wall 52 defines a circle and is positioned to lie in a plane that is perpendicular to a central axis 56 of cylindrical side wall 52. Cylindrical side wall 52 extends axially outwardly from inner edge 54. An axially outer edge 58 of cylindrical side wall 52 is formed at an angle 60 to central axis 56 as shown in FIG. 4. Thus, cylindrical side wall 52 includes a short side 62 and a long side 64 as shown in FIGS. 3 and 4. Angle 60 is selected to correspond to an angle 66 formed between a side wall 68 of vehicle fuel tank 14 and filler neck 12 illustrated in FIG. 1 so that outer edge 58 of cylindrical side wall 52 is essentially flush with body panels 53 of vehicle 22.

Outer shell 30 further includes front wall 70 appended to outer edge 58 of cylindrical side wall 52 as shown in FIGS. 2–4, and front wall 70 and cylindrical side wall 52 cooperate to define an enclosed space or interior region 73 of outer shell 30 adjacent to a ratchet side 88 of front wall 70 as shown in FIG. 4. Front wall 70 includes an edge 72 arranged to define outer nozzle-receiving opening 74. Front wall 70 is generally funnel-shaped thereby providing an outwardly-facing nozzle-guiding surface 76. As pump nozzle 24 advances toward outer nozzle-receiving opening 74, it may engage nozzle-guiding surface 76 as shown in FIG. 2. The funnel-like shape of nozzle-guiding surface 76 acts to radially direct pump nozzle 24 toward outer nozzle-receiving opening 74 as pump nozzle 24 advances into closure assembly 10. One illustrative path that pump nozzle 24 could travel as pump nozzle 24 enters closure assembly 10 is represented by dashed line 77 shown in FIG. 2.

Nozzle-guiding surface 76 is shaped so that nozzle-guiding surface 76 is generally flat between short side 62 and edge 72 and is generally S-shaped between long side 64 and edge 72, as shown in FIGS. 2–4. The transition of nozzle-guiding surface 76 radially between short side 62 and long side 64 is gradual around the face of nozzle-guiding surface 76 as shown best in FIGS. 2 and 3. The S-shape of nozzle-guiding surface 76 provides a flat annular boot-seating surface 78 arranged to engage a boot 80 of a vapor recovery pump nozzle assembly 82 as shown in FIG. 6. Thus, front wall 70 is shaped both to direct advancing pump nozzle 24 toward nozzle-receiving opening 74 as shown in FIG. 2 and to provide boot-seating surface 78 for boot 80 of vapor recovery pump nozzle assembly 82 as shown in FIG. 6.

Outer nozzle-receiving opening 74 is generally circular, as shown in FIGS. 2 and 3, though it is within the scope of the invention as presently perceived to provide an outer nozzle-receiving opening 74 of any shape so long as outer nozzle-receiving opening 74 is sized as described below relative to other openings of closure assembly 10. Additionally, outer nozzle-receiving opening 74 includes a first central axis 84 illustrated in FIGS. 3 and 4 that is generally coincident with central axis 56 of cylindrical side wall 52. First central axis 84 may be spaced-apart from central axis 56 so long as first central axis 84 is positioned as described below relative to other openings of closure assembly 10.

Outer body 32 is appended to outer shell 30. Outer body 32 includes a cylindrical side wall 106 having an axially outer edge 108 defining an inlet 104, shown best in FIGS. 3 and 4. Cylindrical side wall 106 extends axially inwardly from outer edge 108 to an axially inner edge 109 which is arranged to define inner opening 105. Cylindrical side wall 106 is provided with a plurality of openings defining venting windows 110 in fluid communication with an interior region 112 of outer body 32 that is defined by cylindrical side wall 106 as shown in FIGS. 3 and 4.

A radially outwardly extending annular flange 100 is appended to cylindrical side wall 106 of outer body 32 at edge 108. Cylindrical side wall 52 of outer shell 30 is formed to include a plurality of snaps 94 having snap inner walls 98 and being positioned along a radially inner surface 96 of cylindrical side wall 52 as shown in FIGS. 3 and 4. Flange 100 of outer body 32 has an edge 102 that snap-fits into outer shell 30 so that snap inner walls 98 engage edge 102, thereby coupling outer shell 30 to outer body 32. Snap inner walls 98 and edge 102 are of radially uniform cross section so that edge 102 can slide along snap inner walls 98 to provide a rotatable coupling between outer shell 30 and outer body 32.

Inner body 34 is formed to include a second cylindrical side wall 114 arranged to define an outer opening 118, an outlet 120 opposite outer opening 118, and a second interior region 116 therebetween in fluid communication with outer opening 118 and outlet 120. Inner body 34 is connected to outer body 32, and second cylindrical side wall 114 of inner body 34 cooperates with cylindrical side wall 106 of outer body 32 to define valve-receiving space 36 having a central axis 37 coincident with central axis 56 of outer shell 30 as shown in FIG. 4.

Inner body 34 includes a radially outwardly extending annular lip 122 appended to second cylindrical side wall 114 adjacent to outer opening 118. Lip 122 includes an axially outwardly facing first sealing surface 124 and an axially inwardly facing second sealing surface 126. Outer body 32 includes radially inwardly extending annular ledges 128 appended to inner edge 109 as shown in FIGS. 3 and 4. Lip 122 of inner body 34 snap-fits behind ledges 128 of outer body 32 so that second sealing surface 126 engages ledges 128 to retain engagement between inner body 34 and outer body 32 as shown in FIG. 4. Radially outwardly extending tabs 130 are appended to lip 122 and are received by recesses 112 formed in cylindrical side wall 106 of outer body 32 as shown in FIG. 3 to key inner body 34 to outer body 32 to eliminate rotational movement of inner body 34 relative to outer body 32. Inner body 34 and outer body 32 cooperate to form a housing 35.

Filler neck 12 includes a cylindrical wall 13 that defines an interior region 15. In preferred embodiments, base 44 is received by interior region 15. In addition, base 44 includes a cylindrical side wall 206 that defines a closure-receiving space 210 as shown in FIGS. 3 and 4. Inner body 34 is received by closure-receiving space 210 of base 44.

Base 44 may also include an unleaded discriminator 205 as shown, for example, in FIG. 4, to restrict penetration of pump nozzles 24 into filler neck 12 to only those pump nozzles 24 connected to unleaded fuel sources. It is within the scope of the invention as presently perceived to use closure assembly 10 in a filler neck of a vehicle fuel tank that includes a base that does not have unleaded discriminator 205 and in filler neck 12 of vehicle fuel tank 14 that includes base 44 having unleaded discriminator 205.

It is also within the scope of the invention as presently perceived to either mount closure assembly 10 directly in interior region 15 of filler neck 12 without interposing base 44 between closure assembly 10 and filler neck 12, or to mount closure assembly 10 in base 44 which in turn is received by interior region 15 of filler neck 12 as shown in FIGS. 3 and 4. Advantageously, closure assembly 10 is well-suited for use as a retrofit module for vehicle fuel tank filler necks configured for use with a fuel cap. Such vehicle fuel tank filler necks can easily be modified by simply bringing threads or closure retainer apparatus 216 formed on housing 35 into interlocking engagement with thread-engaging grooves formed in the filler neck and rotating outer shell 30 in a clockwise closure-advancing direction 242. Rotation of outer shell 30 causes housing 35 to rotate and to be drawn into the filler neck. After installation, the filler neck carries closure assembly 10 and can be refueled either by an attendant or by a robotic refueling system 16. Use of closure assembly 10 with base 44, which can be interposed between filler neck 12 and closure assembly 10, is described below.

Cylindrical side wall 206 of base 44 is provided with thread-engaging grooves 208 and is formed to include an axially outwardly-facing mouth 212 and an axially inner edge 213. Unleaded discriminator 205 is appended to edge 213 and is formed to include nozzle-directing opening 214 as shown in FIG. 4. Nozzle-directing opening 214 and mouth 212 are in fluid communication with closure-receiving space 210.

Second cylindrical side wall 114 of inner body 34 is formed to include threads 216 that are received by thread-engaging grooves 208 when closure assembly 10 is received in closure-receiving space 210. Gasket 46 is positioned to lie between mouth 212 and second sealing surface 126 of annular lip 122 as shown in FIGS. 3 and 4 and is arranged to provide a seal therebetween to block the flow of ambient air into filler neck 12 or fuel vapor out of filler neck 12 between inner body 34 and base 44. This seal helps to ensure that the flow of fuel vapor out of fuel tank 14 and the flow of ambient air into fuel tank 14 is directed through tank pressure control subassembly 38.

Tank pressure control subassembly 38 includes pressure-relief valve subassembly 40 which is positioned to lie within valve-receiving space 36 formed by outer body 32 and inner body 34 of housing 35 as shown in FIGS. 3 and 4. Pressure-relief valve subassembly 40 includes annular seal plate 132 which is formed to include the sealing portion 135 and the nozzle-receiving portion 133. O-ring 138 sealingly engages both sealing portion 135 of seal plate 132 and first sealing surface 124 of inner body 34 when the tank pressure is below the predetermined maximum pressure. Seal plate 132 of pressure-relief valve subassembly 40 is yieldably urged against O-ring 138 by compression spring 140 to sealingly engage O-ring 138 thereby preventing the flow of air into and fuel vapor out of the vehicle fuel tank 14 between seal plate 132 and O-ring 138.

Compression spring 140 is positioned inside of a compression spring-receiving space 141 of valve-receiving space 36, as shown best in FIG. 4, to engage an axially outwardly-facing surface 142 of an annular lip 146 of seal plate 132 and an axially inwardly-facing surface 132 of a radially inwardly extending annular lip 145 formed on edge 108 of outer body 32. Outwardly-facing surface 142 of seal plate 132 and inwardly-facing surface 143 of outer body 32 define axially inner and axially outer boundaries of compression spring-receiving space 141. Cylindrical side wall 106 of outer body 32 defines an axially outer boundary of compression spring-receiving space 141. Compression spring 140 has a spring constant designed to yieldably urge the pressure-relief valve subassembly 40 inwardly against O-ring 138 provided on inner body 34.

Seal plate 132 of pressure-relief valve subassembly 40 includes an upstanding annular guide wall 148 appended to outwardly-facing surface 142 as shown in FIGS. 3 and 4. Guide wall 148 slidably engages lip 145 and is positioned to lie inside of inlet 104 defined by lip 145 to guide the radial movement of pressure relief valve subassembly 40 during axial outward and inward movement of pressure-relief valve subassembly 40 between the closure-sealing position shown in FIG. 4 and the pressure-relief position shown in FIG. 7. Guide wall 148 also defines an axially inner boundary of compression spring-receiving space 141.

Axially outwardly-facing nozzle-directing ribs 150 are appended to outwardly-facing surface 142 of nozzle-receiving portion 133 as shown in FIGS. 3 and 4. Each nozzle-directing rib 150 has a top surface 151 that is angled relative to outwardly-facing surface 142. Top surface 151 extends from a proximal end 153 positioned to lie inside of inner nozzle-receiving opening 154 to a distal end 155 radially outward of inner nozzle-receiving opening 154. Top surface 151 adjacent to distal end 155 of each nozzle-directing rib 150 is positioned to lie axially outwardly of both proximal end 153 and of outwardly-facing surface 142. Top surfaces 151 cooperate to radially direct pump nozzle 24 toward inner nozzle-receiving opening 154 when pump nozzle 24 enters closure assembly 10 to refuel vehicle fuel tank 14.

Nozzle-receiving portion 133 of seal plate 132 includes inner nozzle-receiving opening 154 and axially inwardly directed upstanding annular seal-receiving wall 137 appended to axially inwardly-facing surface 144 of seal plate 132 as shown in FIG. 4. Seal-receiving wall 137 encircles inner nozzle-receiving opening 154. In addition, axially inwardly directed arcuate retainer-engaging walls (not shown) are appended to seal plate 132 and are positioned to lie radially outward of seal-receiving wall 137. Retainer-engaging walls are formed to include lug-receiving openings (not shown).

Annular valve seat 134 is received by seal-receiving wall 137 as shown in FIG. 4. Annual valve seat 134 includes an axially inwardly facing annular flapper door-seating surface 156, an axially outwardly facing annular seal plate-engaging wall 158, and a wall-engaging portion 160 therebetween. Flapper door-seating surface 156, wall-engaging portion 160, and seal plate-engaging wall 158 cooperate to define an annular groove 162. A retainer 136 is received in groove 162 and cooperates with seal-receiving wall 137 to retain annular valve seat 134 against seal-receiving wall 137 are shown in FIG. 4. Radially outwardly directed lugs 139 are appended to retainer 136 as shown in FIG. 3 and are received by lug-receiving openings (not shown) to hold retainer 136 against seal plate 132.

Flapper door 180 is pivotably appended to seal plate 132 of pressure-relief valve subassembly 40 as shown in FIGS. 3 and 4 to provide closure assembly 10 with a door mechanism. Flapper door 180 includes two spaced-apart axially inwardly extending arms 182. Seal plate 132 also includes two spaced-apart axially inwardly extending arms 186 that are arranged to define a flapper door arm-receiving space 184 therebetween as shown in FIG. 3. Arms 182 of flapper door 180 are received by flapper door arm-receiving space 184 of seal plate 132. Shaft-receiving openings 188 are formed in arms 182 of flapper door 180 and shaft-receiving openings 190 are formed in arms 186 of seal plate 132. Shaft-receiving openings 188, 190 are arranged to lie along a straight line. Pivot shaft 192 is rotatably received by shaft-receiving openings 188, 190 as shown, for example, in FIGS. 3 and 4 so that flapper door 180 can pivot about pivot shaft 192.

Flapper door 180 includes a circular plate 194 appended to arms 182. Circular plate 194 includes a circumferential sealing surface 196 that engages flapper door-seating surface 156 when flapper door 180 is in a sealing position as shown, for example, in FIG. 4. Circular plate 194 also includes a raised axially outwardly directed nozzle-engaging surface 198. Nozzle-engaging surface 198 engages pump nozzle 24 when pump nozzle 24 penetrates closure assembly 10.

Flapper door 180 is yieldably urged against annular valve seat 134 by torsion spring 200 to prevent the flow of air into or fuel vapor out of vehicle fuel tank 14 between the flapper door 180 and annular valve seat 134 when tank pressure is above the predetermined minimum tank pressure. Torsion spring 200 is coiled about pivot shaft 192 and includes a first end 187 engaging one arm 186 of seal plate 132 and a second end 189 engaging an inwardly directed surface 202 of flapper door 180. Torsion spring 200 has a spring constant designed to yieldably urge the flapper door 180 outwardly against annular valve seat 134.

Torsion spring 200 is specifically selected to have a spring constant such that circular plate 194 of flapper door 180 sealingly engages annular valve seat 134 when the tank pressure is above the predetermined minimum pressure and such that circular plate 194 disengages from annular valve seat 134 when tank pressure is below the predetermined minimum pressure to form an opening therebetween. Torsion spring 200 is positioned to lie in housing 35 and is formed to include a central axis 201 arranged to lie along a line that is perpendicular to central axis 37 of housing 35.

Closure assembly 10 is positioned in filler neck 12 of vehicle fuel tank 14 to receive pump nozzle 23 as shown in FIG. 5 or pump nozzle 24 as shown in FIG. 6. As pump nozzle 23, 24 penetrates closure assembly 10, camming engagement of pump nozzle 23, 24 with flapper door 180 forces flapper door 180 inwardly against the outward bias of torsion spring 200 to assume a fully opened nozzle-received position having nozzle-engaging surface 198 in engagement with nozzle 23, 24. Nozzle-engaging surface 198 prevents contact between pump nozzle 23, 24 and sealing surface 196 of flapper door 180. Minimizing contact between sealing surface 196 and pump nozzle 23, 24 or other foreign objects reduces the risk of damage to or contaminating of sealing surface 196.

A standard pump nozzle assembly 81 can include a collar 83 mounted to pump nozzle 23 as shown in FIG. 5. Collar 83 can be formed to include an axially outer wall 85. Front wall 70 of outer shell 30 is formed to include a latching portion 71 adjacent to outer nozzle-receiving opening 74, as shown in FIG. 5. Latching portion 71 is positioned to engage outer wall 85 of collar 83 after pump nozzle 23 is inserted into closure assembly 10 to prevent pump nozzle 23 from inadvertently sliding axially outward out of closure assembly 10. Once refueling is complete, pump nozzle 23 is released from closure assembly 10 by lifting pump nozzle 23 to move collar 83 to a position that is radially inward of latching portion 71 and moving pump nozzle 23 axially outwardly and away from closure assembly 10.

Pump nozzle 24 of vapor recovery nozzle assembly 82 is connected to boot 80 as shown in FIG. 6. Front wall 70 of outer shell 30 is contoured to provide boot-seating surface 78 so that boot 80 can seat against front wall 70 to minimize the escape of fuel vapor between boot 80 and boot-seating surface 78 during refueling of vehicle fuel tank 14.

Typically, vapor recovery pump nozzle assembly 82 further includes a catch 91 having an axially outwardly-facing outer wall 92. Catch 91 is typically connected to pump nozzle 24 as shown in FIG. 6. Outer wall 92 engages latching portion 71 after pump nozzle 24 is inserted into closure assembly 10 to prevent pump nozzle 24 from sliding axially outwardly out of closure assembly 10 during refueling of fuel tank 14. Once refueling is complete, pump nozzle 24 is released from closure assembly 10 by lifting pump nozzle 24 to move outer wall 92 to a position that is radially inward of latching portion 71 and moving pump nozzle 24 axially outwardly and away from closure assembly 10.

When either an attendant or a robotic refueling system 16 prepares to refuel vehicle 22, pump nozzle 24 is directed toward closure assembly 10. Front wall 70 of outer shell 30 is contoured to provide a funnel-like nozzle-guiding surface 76 arranged to direct advancing pump nozzle 24 toward outer nozzle-receiving opening 74. After passing through nozzle-receiving opening 74, a tip 232 of advancing pump nozzle 24 engages nozzle-engaging surface 198 of flapper door 180.

Camming engagement of pump nozzle 24 and nozzle-engaging surface 198 caused by the advancement of pump nozzle 24 causes tip 232 to act against torsion spring 200 to force flapper door 180 into the fully open refueling position shown in FIG. 5. In addition, torsion spring 200 acts through flapper door 180 to bias pump nozzle 24 downwardly thereby directing pump nozzle 24 toward nozzle-directing opening 214 of base 44. Pump nozzle 24 continues to advance until tip 232 penetrates nozzle-directing opening 214 and, for vapor recovery pump nozzle assembly 82, until boot 80 engages boot-seating surface 78 as shown in FIG. 6.

Nozzle-directing opening 214 of base 44 is formed to include a third central axis 234 that is typically spaced apart from a central axis 215 of filler neck 12 as shown in FIG. 4. Central axis 215 of filler neck 12 is typically coincident with central axis 56 of outer shell 30 and first central axis 84 of outer nozzle-receiving opening 74 of outer shell 30. Third central axis 234 is typically spaced apart from first central axis 84 of outer nozzle-receiving opening 74 as illustrated in FIG. 4.

In addition, inner nozzle-receiving opening 154 of seal plate 132 is formed to include a second central axis 236. Second central axis 236 is also typically spaced-apart from first central axis 84 of outer nozzle-receiving opening 74. Second central axis 236 is positioned so that inner nozzle-receiving opening 154 receives advancing pump nozzle 24 from outer nozzle-receiving opening 74 and then guides advancing pump nozzle 24 to nozzle-directing opening 214 of base 44 as shown in FIGS. 5 and 6.

Inner nozzle-receiving opening 154 is sized and second central axis 236 of inner nozzle-receiving opening 54 is spaced apart from first central axis 84 so that sufficient overlap of outer nozzle-receiving opening 74 and inner nozzle-receiving opening 154 is present in an axial direction to permit pump nozzle 24 to be received by both first nozzle-receiving opening 74 and inner nozzle-receiving opening 154. Likewise, nozzle-directing opening 214 is sized and third central axis 234 is spaced apart from first central axis 84 and second central axis 236 so that sufficient overlap of outer and inner nozzle-receiving openings 74, 154 and nozzle-directing opening 214 is present in an axial direction to permit pump nozzle 24 to be received by all three of outer and inner nozzle-receiving openings 74, 154 and nozzle-directing opening 214 as shown in FIGS. 5 and 6. However, it is within the scope of the invention as presently perceived to provide a closure assembly having two or all three of the first, second, and third central axes 84, 236, 234 coincident.

In operation, when vehicle 22 is not being refueled, pressure-relief valve subassembly 40 permits fuel vapor from the vehicle fuel tank 14, designated by arrows 238 of FIG. 7, to vent from vehicle fuel tank 14 when the pressure inside of vehicle fuel tank 14 is above the predetermined maximum pressure as indicated by double arrow 239 of FIG. 7. Under normal tank pressure conditions with tank pressure below the predetermined maximum pressure a shown in FIG. 4, pressure-relief valve subassembly 40 is in its closure-sealing position having inwardly facing surface 144 of annular lip 146 of seal plate 132 yieldably urged against O-ring 138 by compression spring 140 blocking the flow of fuel vapor between inlet 104 and outlet 120 of housing 35 thereby preventing the flow of fuel vapor 238 out of vehicle fuel tank 14.

Seal plate 132 is urged outwardly away from O-ring 138 in response to pressure against flapper door 180 and seal plate 132 in excess of a predetermined superatmospheric pressure. Movement of seal plate 132 away from O-ring 138 opens the vent passageway allowing for the discharge of fuel vapor 238 from the vehicle fuel tank 14, through outlet 120 into closure assembly 10, between O-ring 138 and seal plate 132, and out of venting windows 110 of outer body 32 as shown in FIG. 7. Once sufficient fuel vapor 238 has been discharged from vehicle fuel tank 14 to lower the pressure in vehicle fuel tank 14 below the predetermined maximum tank pressure, compression spring 140 yieldably urges annular lip 146 of seal plate 132 inwardly against O-ring 138.

Figure 8:
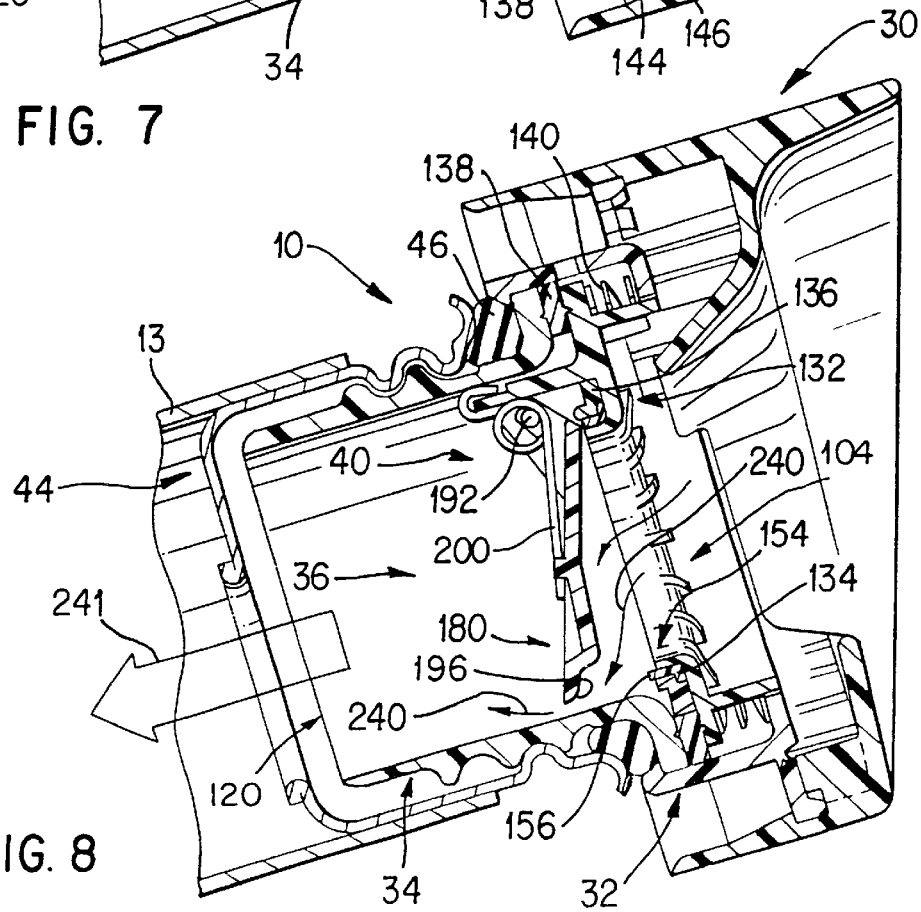
FIG. 8 is a view similar to FIG. 7 showing the spring-loaded, pivotable flapper door in the vacuum-relief valve after it has been pivoted in the closure assembly to a vacuum-relief position due to the presence of subatmospheric fuel vapor pressure in the filler neck, thereby permitting the flow of ambient air from the atmosphere into the vehicle fuel tank through the closure assembly and filler neck.

In addition, vacuum-relief valve subassembly 42 permits ambient air from the atmosphere outside the closure assembly 10, designated by arrows 240 of FIG. 8, to enter vehicle fuel tank 14 when the pressure inside of vehicle fuel tank 14 is below a predetermined minimum pressure as indicated by double arrow 241 of FIG. 8. Under normal tank pressure conditions with tank pressure above the predetermined minimum pressure, sealing surface 196 of flapper door 180 is yieldably urged against flapper door seating surface 156 of annular valve seat 134 by torsion spring 200, thereby providing a seal to block the flow of fuel vapor 238 out of or ambient air 240 into the vehicle fuel tank 14 through inner nozzle-receiving opening 154 of pressure-relief valve subassembly 40 as shown in FIG. 4.

In its sealing position, flapper door 180 provides a seal between sealing surface 196 and flapper door-seating surface 156. Once the pressure in vehicle fuel tank 14 decreases below the predetermined subatmospheric pressure, flapper door 180 is drawn inwardly, pivoting away from annular valve seat 134 and allowing the flow of ambient air 240 from outside of the vehicle fuel tank 14, through inlet 104 and into valve-receiving space 36, through inner nozzle-receiving opening 154, through outlet 120, and into vehicle fuel tank 14 as shown in FIG. 8. Once sufficient ambient air 240 has entered vehicle fuel tank 14 to raise the pressure in vehicle fuel tank 14 above the predetermined minimum tank pressure, torsion spring 200 yieldably urges flapper door 180 against annular valve seat 134.

Installation of closure assembly 10 into closure-receiving space 210 illustrates in FIGS. 9–13 is simplified by a torque-override connection between outer shell 30 and outer body 32 that ensures proper installation of closure assembly 10 in closure-receiving space 210. Flange 100 of outer body 32 includes six peripherally and slightly axially outwardly extending resilient fingers 220 each having a driven tooth 222. Driven teeth 222 are equally spaced about the circumference of flange 100 to serve as engaging means to receive torque from outer shell 30. Driven teeth 222 each include an inclined face 224 and an upright face 226.

Outer shell 30 also includes a plurality of inclined drive teeth 86 spaced equally about the circumference of ratchet side 88 of front wall 70 of outer shell 30 to serve as engaging means for propelling flange 100 about axis of rotation 56 through engagement with driven teeth 222 as shown in FIGS. 3, 4, and 11. Drive teeth 86 each include an inclined face 228 and an upright face 230. Each upright face 230 cooperates with the inclined face 228 of the next adjacent tooth 86 to define an interdental pocket 87.

A person wishing to install closure assembly 10 in base 44 at a time of vehicle manufacture or repair grasps outer shell 30 and applies torque thereto in a clockwise closure-advancing direction designated by arrow 242 in FIG. 3. Torque is transmitted to flange 100 by the engagement of drive teeth 86 against driven teeth 222. Resilient fingers 220 bias driven teeth 222 toward front wall 70, thus biasing driven teeth 222 against drive teeth 86 to establish a torque-transmitting connection. Closure-advancing torque transmitted to outer shell 30 by engagement of inclined faces 228 of drive teeth 86 and inclined faces 224 of driven teeth 222, as shown in FIG. 10, is further transmitted to flange 100, outer body 32, and inner body 34.

As the installer continues to apply torque in closure-advancing direction 242, threads 216 of inner body 34 interlock with thread-engaging grooves 208 formed on base 44 so that closure assembly 10 advances to a tight seated position in base 44 in which annular gasket 46 is trapped between the mouth 212 of base 44 and sealing surface 126 of inner body 34 to establish a seal between the inner body 34 and base 44 as shown in FIG. 9. Note, however, that outer shell 30 may by oriented in a position other than the preferred orientation when closure assembly 10 achieves the tight seated position in base 44 as shown in FIG. 10 where outer shell 30 is at an angle 246 away from the desired orientation.

Advantageously, closure assembly 10 is designed to accommodate additional closure-advancing torque which an installer might apply. When closure assembly 10 is advanced to a tight seated position, inner body 34 is no longer able to rotate with respect to base 44. Thus, closure-advancing torque applied to outer shell 30 and transmitted to flange 100 in the above-described manner cannot be further transmitted to inner body 34. Therefore, each additional increment of closure-advancing torque applied to outer shell 30 translates to an additional increment of engaging force applied by drive teeth 86 to driven teeth 222. Since the torque cannot be translated into rotational motion, it builds up in outer shell 30 to the point at which the torque overcomes the frictional forces between drive teeth 86 and driven teeth 222. Resilient fingers 220 flex so that driven teeth 222 can move relative to drive teeth 86 out of interdental pockets 87 along inclined faces 224, 228, as shown in FIG. 11.

Owing to the relative angles of inclined faces 228, 224 of drive teeth 86 and driven teeth 222, respectively, the movement of drive teeth 86 relative to driven teeth 222 biases resilient fingers 220 axially inwardly. Continued application of torque will cause each driven tooth 222 to move from its original interdental pocket 87 to the adjacent interdental pocket 87, at which point each resilient finger 220 will bias each driven tooth 222 axially outwardly so that each driven tooth 222 is presented for driving engagement with an adjacent drive tooth 86.

If additional closure-advancing torque is applied to outer shell 30 driven teeth 222 will continue to move relative to drive teeth 86 as above-described with a characteristic "clicking" noise. That is, outer shell 30 will essentially rotate freely with respect to flange 100 and will thus absorb excess torque while maintaining the seal between inner body 34 and base 44 intact.

The torque-overriding connection prevents over tightening of inner body 34 in base 44, thereby ensuring that gasket 46 sealingly engages both second sealing surface 126 and mouth 212. It also allows for the rotation of outer shell 30 after installation of closure assembly 10 into filler neck 12 to adjust the orientation of outer shell 30 so that the short side 62 is positioned generally below long side 64 as shown in FIGS. 11 and 12, and outer edge 58 of cylindrical side wall 52 is essentially flush with vehicle body panels 53.

Although in preferred embodiments first central axis 84 of outer nozzle-receiving opening 74 is coincident with central axis 56 of outer shell 30, second central axis 236 of inner nozzle-receiving opening 154 is spaced-apart from central axis 56 of outer shell 30. Improper orientation of second central axis 236 of inner nozzle-receiving opening 154 could make it difficult for a user to insert pump nozzle 24 into closure assembly 10. Advantageously, closure assembly 10 is configured to orient pressure-relief valve subassembly 40 thereby orienting inner nozzle-receiving opening 154 when the user orients outer shell 30.

Outer shell 30 is provided with two axially-inwardly directed lugs 248 appended to ratchet side 88 of front wall 70 as shown in [FIG. 4.]*FIG. 4 and FIG. 4A*.

Two axially outwardly directed splines 252 are appended to seal plate 132 adjacent to guide wall 148 as shown in FIGS. 3 and 4. The lugs 248 are spaced apart so that the spline-receiving space 250 receives the splines 252. Each spline 252 engages a lug 250, thereby eliminating independent rotational movement of outer shell 30 relative to seal plate 132 of pressure-relief valve subassembly 40. Pressure-relief valve subassembly 40 rotates with outer shell 30 relative to housing 35 when the user applies sufficient closure-advancing torque to cause outer shell 30 to rotate relative to housing 35.

Although it should not frequently be necessary to remove closure assembly 10 from closure-receiving space 210, a torque-transmitting connection can be established in a closure-removal direction represented by arrow 244 in FIGS. 3 and 11. In removal of closure assembly 10, drive teeth 86 engage driven teeth 222 to provide a positive connection between flange 100 and outer shell 30. As shown in FIG. 11, when torque is applied to outer shell 30 to rotate closure assembly 10 in closure-removal direction 244, the torque is transmitted to flange 100 by way of engagement of upright faces 230 of drive teeth 86 against upright faces 226 of driven teeth 222. Since it is not necessary to accommodate excess torque in closure removal, upright faces 226, 230 can be provided for the torque-transmitting connection rather than inclined faces 224, 228 as are provided to establish the closure-advancing connection. The cooperation of resilient fingers 220, drive teeth 86, and driven teeth 222 to provide a torque-overriding connection in one direction and a direct connection in the other direction is well known in the art, and is specifically described in U.S. Pat. Nos. 4,280,346 to Evans and 5,110,003 to MacWilliams, the entire disclosures of which are hereby incorporated by reference.

Figure 14:
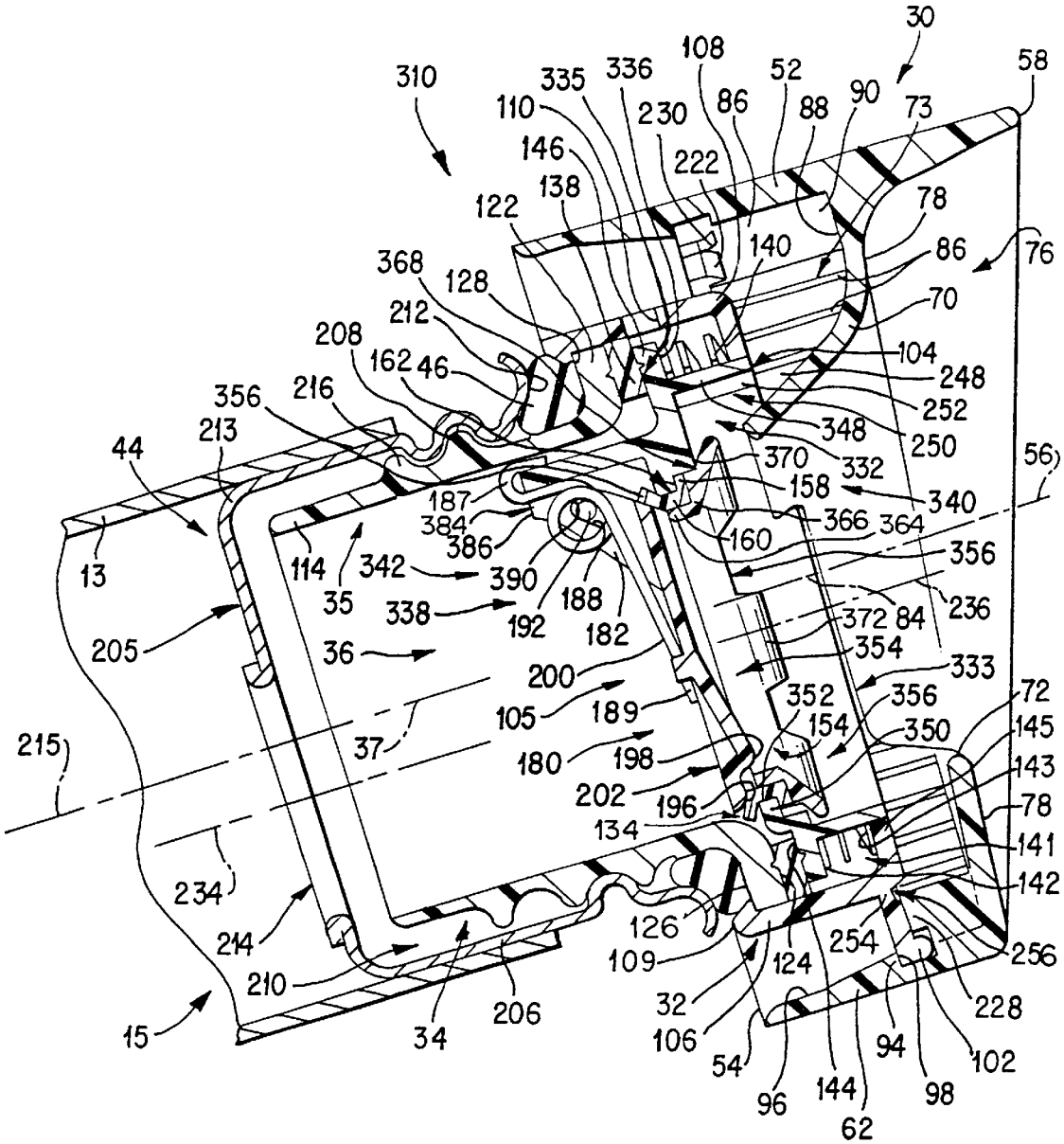
FIGS. 14–16 show a second embodiment of a closure assembly in accordance with the present invention having a spring-loaded, annular, slidable pressure-relief valve formed to include a nozzle-receiving opening and an annular vacuum-relief valve seat and a sleeve inserted into the nozzle-receiving opening.
Figure 15:
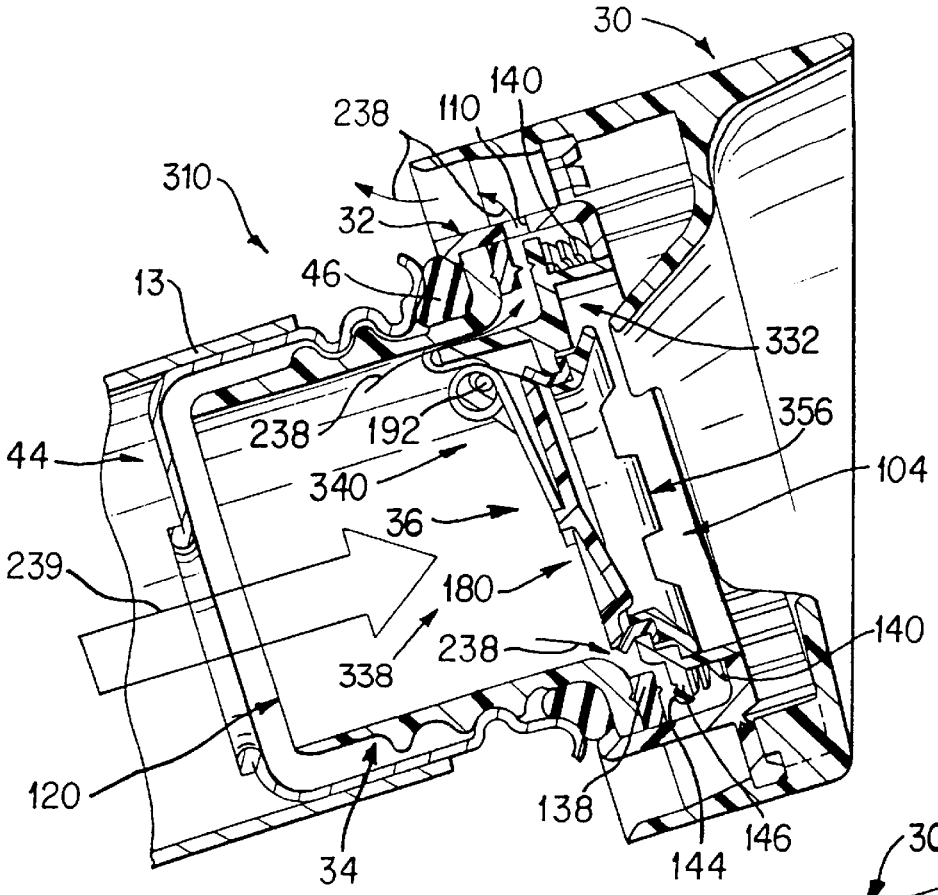
Figure 16:
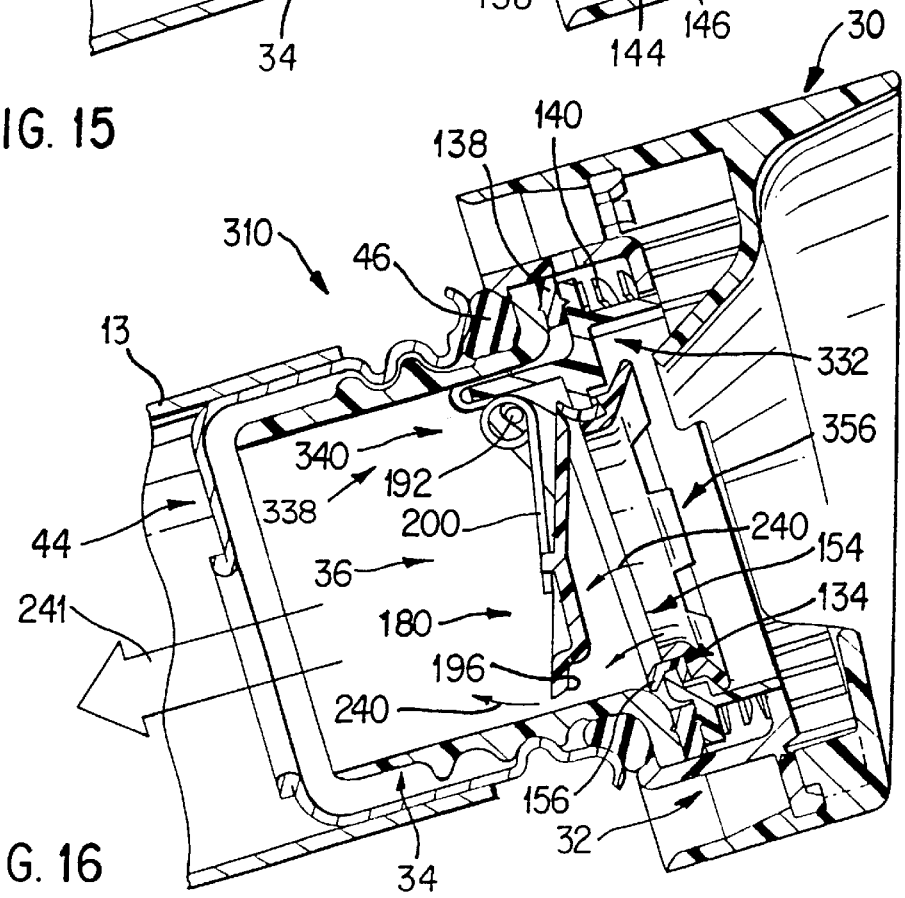

A second embodiment of a closure assembly 310 including a second embodiment of a tank pressure control subassembly 338 is shown in FIGS. 14–16. Closure assembly 310 includes outer shell 30 having front wall 70 which is formed to include nozzle-guiding surface 76 and outer nozzle-receiving opening 74. Outer shell 30 is rotatably connected to outer body 32 of housing 35. Outer body 32 and inner body 34 of housing 35 cooperate to define valve-receiving space 36. Tank pressure control subassembly 338 including pressure-relief valve subassembly 340 and vacuum-relief valve subassembly 342 is received by valve receiving space 36.

Pressure-relief valve subassembly 340 includes an annular seal plate 332 formed to include a nozzle-receiving portion 33 and a sealing portion 335. Seal plate 332 is biased inwardly by a compression spring 140 so that sealing portion 335 sealingly engages an O-ring 138. O-ring 138 is trapped between the first sealing surface 124 of inner body 34 and sealing portion 335 to establish a seal therebetween so that pressure-relief valve subassembly 340. O-ring 138, and inner body 34 cooperate to block the flow of air into fuel tank 14 and the flow of fuel vapor out of fuel tank 14 between sealing portions 335 and inner body 34 when the tank pressure is below the predetermined maximum tank pressure.

Sealing portion 335 of pressure-relief valve subassembly 340 is movable relative to housing 35 and causes nozzle-receiving portion 333 to move along with sealing portion 335 between an axially inward closure-sealing position shown in FIG. 14 sealingly engaging O-ring 138 and an axially outward pressure-relief position shown in FIG. 15 away from O-ring 138 to define an opening therebetween to vent fuel vapor from fuel tank 14 when tank pressure exceeds the predetermined maximum pressure. Nozzle-receiving portion 333 is formed to include an inner nozzle-receiving opening 354 formed to receive the pump nozzle 24 during refueling of fuel tank 14.

Vacuum-relief valve subassembly 342 includes an annular valve seat 134 mounted in inner nozzle-receiving opening 354 and an annular door seal-retainer sleeve 356 engaging annular valve seat 134 and positioned to lie in inner nozzle-receiving opening 354 as shown in FIGS. 14 and 16. Vacuum-relief valve subassembly 342 further includes a flapper door 180 that is pivotably appended to seal plate 332 of pressure-relief valve subassembly 340. It should be understood that vacuum-relief valve subassembly 342 moves with seal plate 332 as the pressure-relief valve subassembly 340 moves between the pressure-relief position shown in FIG. 15 and the closure-sealing position shown in FIG. 14.

Flapper door 180 of vacuum-relief subassembly 342 is biased axially outwardly by torsion spring 200 to a sealing position shown in FIG. 14 sealingly engaging seal plate 332 to block the flow of air through the inner nozzle-receiving opening 354 when tank pressure is above the predetermined minimum tank pressure. Flapper door 180 is drawn inwardly away from the sealing position when the tank pressure is below the predetermined minimum pressure to pivot to the vacuum-relief position shown in FIG. 16 away from seal plate 332 to form an opening therebetween thereby allowing the flow of air through inner nozzle-receiving opening 354 to fuel tank 14 to relieve subatmospheric tank pressure.

Seal plate 332 of pressure-relief valve subassembly 340 includes an upstanding annular guide wall 348 appended to an outwardly-facing surface 336 as shown in FIG. 14. Guide wall 348 slidably engages lip 145 and is positioned to lie inside of inlet 104 defined by lip 145 to guide the radial movement of pressure relief valve subassembly 340 during axial outward and inward movement of pressure-relief valve subassembly 340 between the closure-sealing position shown in FIG. 14 and the pressure-relief position shown in FIG. 15.

Nozzle-receiving portion 333 of seal plate 332 includes a radially inwardly extending ledge 350 having an inner edge 352 defining inner nozzle-receiving opening 354 as shown in FIG. 14. Annular valve seat 134 is inserted into inner nozzle-receiving opening 354 so that ledge 350 is received in groove 162 of annular valve seat 134. A door seal-retainer sleeve 356 is inserted in inner nozzle-receiving opening 354 and cooperates with ledge 350 to retain annular valve seat 134 against inner edge 352 as shown in FIGS. 14–16.

Door seal-retainer sleeve 356 includes an axially inner annular wall 364 engaging wall-engaging portion 160 of annular valve seat 134 as shown in FIG. 14. Door seal-retainer sleeve 356 further includes an axially outer annular wall 366 engaging seal plate-engaging wall 158 of annular valve seat 134. Outer annular wall 366 is formed to include axially inwardly opening notches 368 that engage axially outwardly directed tabs 370 formed in outwardly facing surface 336 of seal plate 332. Notches 368 cooperate with tabs 370 and inner annular wall 164 of seal plate 332 cooperates with wall-engaging portion 160 of annular valve seat 134 to retain door seal-retainer sleeve 356 in snap-fit engagement with seal plate 332, thereby retaining annular valve seat 134 against inner edge 352 of seal plate 332 as shown in FIG. 14.

Outer annular wall 366 of door seal-retainer sleeve 356 is formed to further include a funnel-shaped top surface 372 surrounding inner nozzle-receiving opening 354 as shown in FIG. 14. As pump nozzle 24 advances from outer nozzle-receiving opening 74 toward inner nozzle-receiving opening 354 it may engage top surface 372. The funnel-like shape of top surface 372 acts to radially direct pump nozzle 24 toward inner nozzle-receiving opening 354 as pump nozzle 24 advances into closure assembly 10 when pump nozzle 24 enters closure assembly 10 to refuel vehicle fuel tank 14.

Flapper door 180 is pivotably appended to seal plate 332 of pressure-relief valve subassembly 40 as shown in FIGS. 14 and 16. Flapper door 180 includes two spaced-apart axially inwardly extending arms 182. Seal plate 332 also includes two spaced-apart axially inwardly extending arms 386 that are arranged to define a flapper door arm-receiving space 384 therebetween as shown in FIG. 14. Arms 182 of flapper door 180 are received by flapper door arm-receiving space 384 of seal plate 332. Shaft-receiving openings 188 are formed in arms 182 of flapper door 180 and shaft-receiving openings 390 are formed in arms 386 of seal plate 332. Shaft-receiving openings 188, 390 are arranged to lie along a straight line. Pivot shaft 192 is rotatably received by shaft-receiving openings 188, 190 as shown, for example, in FIG. 14 so that flapper door 180 can pivot about pivot shaft 192.

Flapper door 180 is yieldably urged against annular valve seat 134 by torsion spring 200 to prevent the flow of air into or fuel vapor out of vehicle fuel tank 14 between the flapper door 180 and annular valve seat 134 when tank pressure is above the predetermined minimum tank pressure. Torsion spring 200 is coiled about pivot shaft 192 and includes a first end 187 engaging one arm 386 of seal plate 332 and a second end 189 engaging an inwardly directed surface 202 of flapper door 180. Torsion spring 200 has a spring constant designed to yieldably urge the flapper door 180 outwardly against annular valve seat 134.

Figure 17:
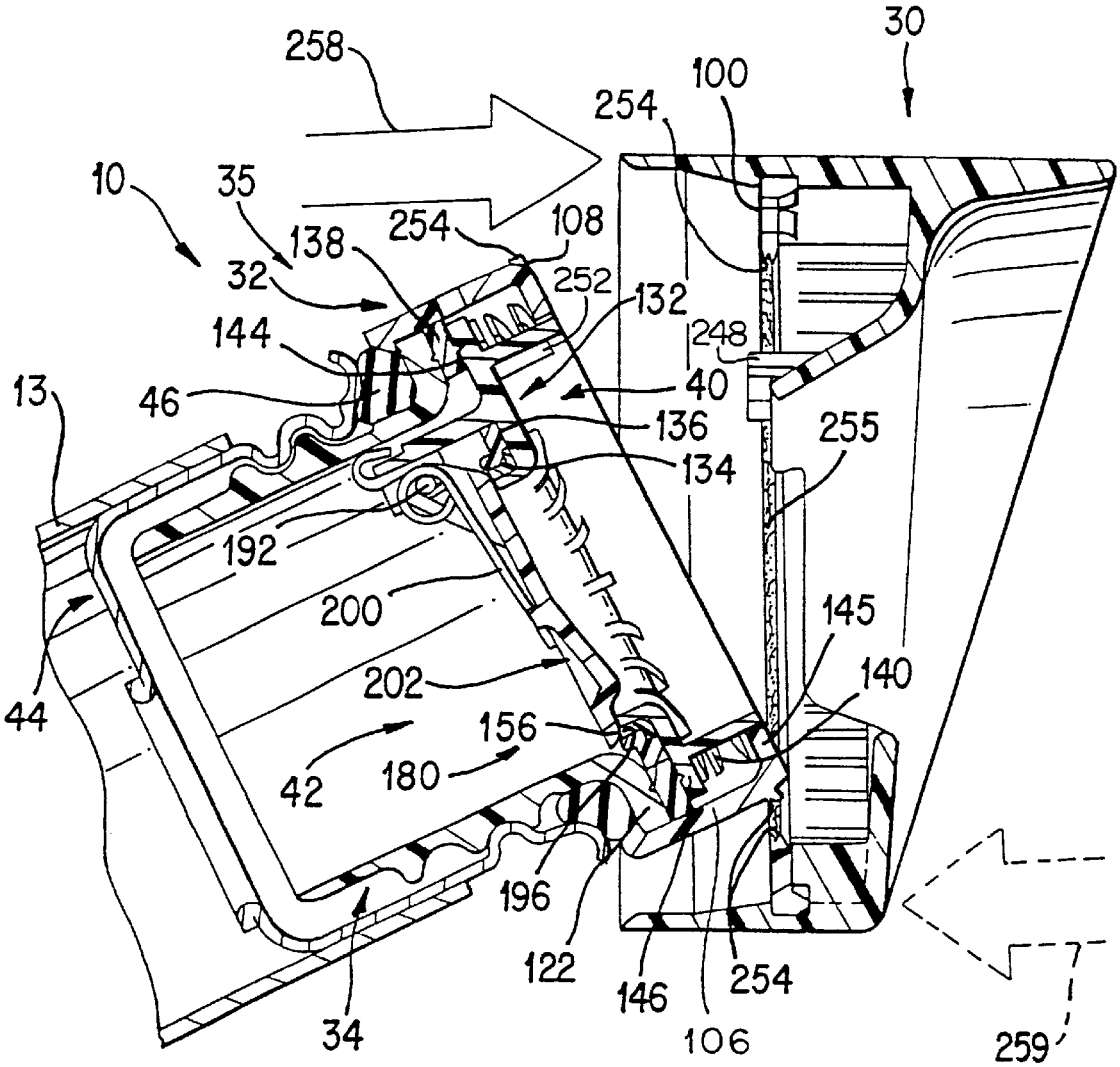
FIG. 17 is a view similar to FIGS. 4–8 showing the outer shell after it has been broken away from the housing by an impact (represented by two double arrows) leaving the housing and a pressure control subassembly in the housing intact and in a closed position continuing to close the vehicle filler neck.

Advantageously, in both closure assembly 10 and closure assembly 310, flange 100 is configured to enhance separation of flange 100 from edge 108 of outer body 32 if closure assembly 10 is subjected to an impact greater than a predetermined magnitude, represented by arrow 258 and arrow 259, both of which represent impacts that could cause flange 100 to separate from housing 35 as shown in FIG. 17. Flange 100 is formed to include a frangible section 254 arranged to enhance breakage of closure assembly 10 at frangible section 254, shown in FIGS. 4, 14, and 17. Flange 100 is formed to include annular groove 256 adjacent to edge 108 of cylindrical side wall 106 as shown in FIGS. 3 and 4. Annular groove 256 is sized to form frangible section 254 adjacent to groove 256 to enhance the probability that flange 100 will separate from cylindrical side wall 106 adjacent to groove 256 rather than other elements of closure assembly 10.

Separation of flange 100 from outer body 32 at frangible section 254 will result in the separation of outer shell 30 and flange 100 from closure assembly 10 along fracture line 255 as shown in FIG. 17. Pressure-relief valve subassembly 40, vacuum-relief valve subassembly 42, annular slip 145 of outer body 32, and annular lip 122 of inner body 34 will not be affected by removal of flange 100. Compression spring 140 will continue to act against annular lip 146 of seal plate 132 to urge surface 144 against O-ring 138 to provide a seal preventing the flow of fuel vapor out of vehicle fuel tank 14, and torsion spring 200 will still act against inwardly-facing surface 202 of flapper door 180 to urge sealing surface 196 into sealing engagement against annular valve seat 156 to prevent the flow of ambient air into vehicle fuel tank 14.

This construction is intended to maximize the likelihood that filler neck 12 will remain sealed even if closure assembly 10 is subjected to an impact that causes separation of outer shell 30 and flange 100 from outer body 32.

Figure 18:
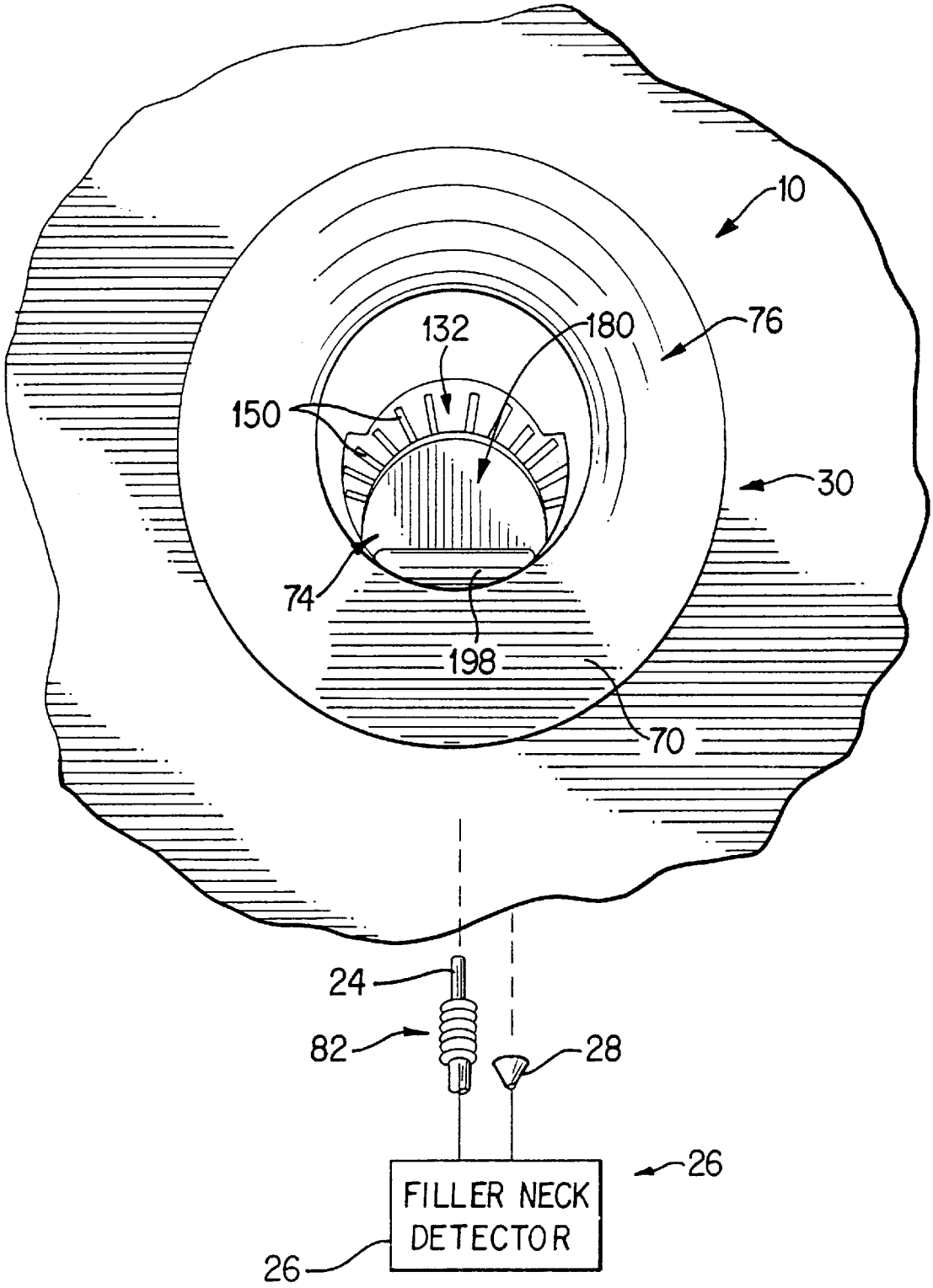
FIG. 18 is a front elevation view of the outer shell of FIG. 12 and FIG. 14 showing the nozzle-guiding surface of the outer shell cooperating with the flapper door to form a "bulls-eye" pattern as the closure assembly is seen by an external filler neck detector.

Certain robotic refueling systems 16 use filler neck detector 26 to determine the location of closure assembly 10. Filler neck detector 26 can use computer vision and recognition technology to determine the location of closure assembly 10, in which case external nozzle-positioning sensor 28 would include a camera positioned to view closure assembly 10 from in front of front wall 70 as shown in FIG. 18. To accommodate filler neck detector 26, outer shell 30 is made from a material having a light color and flapper door 180 is made from a material having a contrasting dark color. This provides closure assembly 10 with a "bulls-eye" appearance from the vantage point of the camera as shown in FIG. 18 that can easily and readily be recognized by computer vision and recognition technology.

Although the preferred outer shell 30 and flapper door 180 present a generally "bulls-eye" pattern for detection by computer vision and recognition technology, it is within the scope of the invention as presently perceived to provide any pattern of contrasting shades, either a light pattern on a dark background or a dark pattern on a light background, as seen from a front elevation view of closure assembly 10. It is important that the contrast is sufficient to permit a computer vision and recognition system to distinguish the pattern from the background. It is, therefore, within the scope of the invention as presently perceived to provide a pattern of nearly any shape or a pattern including several shapes such as stripes, dots, dashes, arrows, or any combination of these or other contrasting designs that can be provided on or near the face of closure assembly 10 and detected by filler neck detector 26.

Outer shell 30 can be made from a material having a dark color and flapper door 180 can be made from a material having a contrasting light color. This configuration was not chosen for the preferred embodiment because flapper door 180 may darken with use-related contact and wear and may, as a result, eventually fail to provide the desired contrast.

Figure 19:
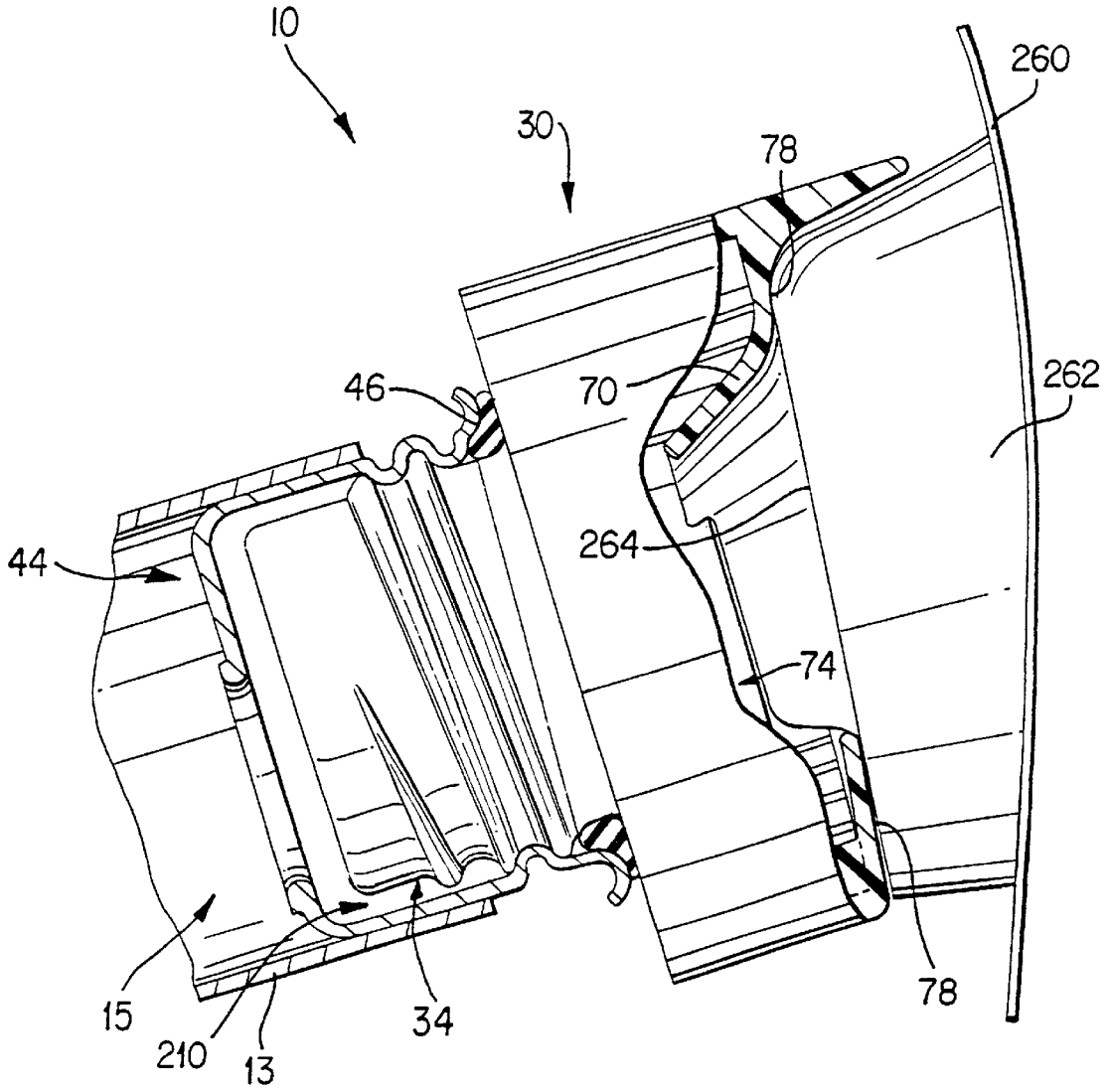
FIG. 19 is a side elevation view of the closure assembly of FIG. 4 with a portion broken away showing a dust cover mounted on a fuel door of a vehicle (not shown) in a position engaging the boot-seating surface of the outer shell to prevent dust from collecting in the closure assembly when the fuel door is closed.

Closure assembly 10 can be mounted on a vehicle 22 having a fuel door 260 and a dust cover 262 mounted on fuel door 260 as shown in FIG. 19. Dust cover 262 has an axially inwardly-facing surface 264 engaging boot-seating surface 78 of outer shell 30. Dust cover 262 is connected to fuel door 260 and is positioned to move away from outer shell 30 when fuel door 260 swings to an opened position. Dust cover 262 is typically made from an open cell foam pad, through any material that can be mounted on fuel door 260 to cover outer shell 30 and reduce the amount of dust that collects in closure assembly 10 can be used.

Although the invention has been described in detail with reference to preferred embodiments, variations and modifications exist within the scope and spirit of the invention as described and defined in the following claims.

I claim:

1. A filler neck closure assembly for a vehicle fuel tank filler neck, the assembly comprising a closure for closing the filler neck, the closure including a housing formed to include an interior region for receiving fuel vapor in the filler neck and a vent aperture for discharging fuel vapor from the interior region, closure retainer apparatus appended to the housing and configured to engage the filler neck when the housing is installed in the filler neck to block removal of the closure from the filler neck, a seal member engaging the housing and lying in a position to engage the filler neck to establish a sealed connection between the housing and the filler neck when the housing is installed in the filler neck, and a movable tank pressure control assembly mounted for movement in the interior region of the housing between a filler neck-closing position blocking discharge of fuel vapor in the filler neck through the vent aperture and a filler neck-venting position allowing discharge of fuel vapor in the filler neck through the vent aperture, the movable tank pressure control assembly including a nozzle-receiving opening and a door mechanism normally closing the nozzle-receiving opening.

2. The assembly of claim 1, further comprising an outer shell formed to include a nozzle-receiving opening aligned with the nozzle-receiving opening formed in the movable tank pressure control assembly to allow a fuel pump nozzle to pass through said nozzle-receiving opening and open the door mechanism to reach the interior region of the housing, the outer shell being mounted on the housing for rotation about an axis passing through the interior region of the housing to allow the outer shell to be rotated relative to the housing to a predetermined orientation relative to the housing.

3. The assembly of claim 2, wherein the closure retainer apparatus includes annular flanges for rotatably engaging the filler neck and further comprising a torque-override mechanism engaging the outer shell and housing and providing a torque-limited driving connection between the outer shell and the housing when the outer shell is rotated in a cap-advancing direction.

4. The assembly of claim 2, wherein the torque-override mechanism includes a resilient finger cantilevered to the housing, a driven tooth appended to the resilient finger to move therewith relative to the housing, and a plurality of drive teeth appended to the outer shell and positioned to engage the driven tooth on the resilient finger in response to rotation of the outer shell about the axis of rotation.

5. The assembly of claim 4, wherein the housing includes a body engaging the seal member and a frangible section interconnecting the body and the resilient finger to support the resilient finger in a cantilevered position relative to the housing.

6. The assembly of claim 3, wherein the torque-override mechanism includes a plurality of resilient fingers cantilevered to the housing, a driven tooth appended to each resilient finger, and a plurality of drive teeth appended to the outer shall and positioned to engage the driven teeth on the resilient fingers in response to rotation of the outer shell about the axis of rotation.

7. The assembly of claim 6, wherein the housing includes a body engaging the seal member and a frangible section interconnecting the body and each of the resilient fingers to support the resilient fingers in cantilevered positions relative to the housing.

8. The assembly of claim 3, wherein the housing includes an outer body [termed] *formed* to include the vent aperture and the torque-override mechanism includes a resilient finger cantilevered to the outer body, a driven tooth appended to the resilient finger, and a plurality of drive teeth appended to the outer shell and positioned to engage the driven tooth on the resilient arm in response to rotation of the outer shell about the axis of rotation.

9. The assembly of claim 2, wherein the outer shell includes a side wall having an annular outer edge and a front wall appended to the annular outer edge and formed to include the nozzle-receiving opening formed in the outer shell, the side wall and the front wall cooperate to define an enclosed space receiving an axially outer portion of the housing therein.

10. The assembly of claim 9, wherein the front wall includes a nozzle-guiding surface inclined with respect to the axis of rotation and positioned to lie between the annular outer edge of the side wall and the nozzle-receiving opening formed in the outer shell.

11. The assembly of claim 9, wherein the outer shell further includes a plurality of drive teeth positioned to lie in the enclosed space and engage the housing to provide a rotational driving connection between the outer shell and the housing.

12. The assembly of claim 9, further comprising a torque-override mechanism engaging the outer shell and housing in the enclosed space and providing a torque-limited driving connection between [the-outer] *the outer* shell and the housing.

13. The assembly of claim 9, wherein the side wall includes an annular interior surface and the housing includes an annular flange lying in the enclosed space and having an annular outer edge abutting the annular interior surface of the side wall in rotative bearing engagement.

14. The assembly of claim 13, wherein the housing includes a body engaging the seal member and a frangible section interconnecting the body and the annular flange.

15. The assembly of claim 13, wherein the housing includes a body formed to include the interior region and the annular flange includes an inner edge appended to the body.

16. The assembly of claim 13, wherein the housing includes a body formed to include the interior region and the annular flange is coupled to the body, and further comprising a torque-override mechanism lying in the enclosed space and including a resilient finger cantilevered to the annular flange, a driven tooth appended to the resilient finger to move therewith in the enclosed space relative to the annular flange, and a plurality of drive teeth appended to the outer shell to lie in the enclosed space and engage the driven tooth on the resilient finger in response to rotation of the outer shell relative to the housing about the axis of rotation.

17. The assembly of claim 16, wherein the housing further includes a frangible section appended to the body and the annular flange is coupled to the body by the frangible section.

18. The assembly of claim 13, wherein the housing is formed to position the vent aperture to pen into the enclosed space in close proximity to the annular flange.

19. The assembly of claim 2, wherein the outer shell is formed to include a spline-receiving space and the movable tank pressure control assembly is formed to include a spline received in the spline-receiving space formed in the outer shell so that the movable tank pressure control assembly is keyed to rotate with the outer shell relative to the housing in response to rotation of the outer shell about the axis of rotation.

20. The assembly of claim 19, wherein the outer shell includes a side wall having an annular outer edge and a front wall appended to the annular outer edge and formed to include the nozzle-receiving opening formed in the outer shell, the side wall and the front wall cooperate to define an enclosed space receiving an axially outer portion of the housing therein, and the outer shell further includes lugs positioned to lie in the enclosed space to define the spline-receiving space therebetween.

21. The assembly of claim 19, wherein the movable tank pressure control assembly includes a pressure-relief seal plate having an annular lip and an annular guide wall appended to the annular lip, a spring lying around the annular guide wall and yieldably biasing the annular lip to urge the annular lip to a normally closed position engaging the housing to establish the filler neck-closing position of the movable tank pressure control assembly, and the spline is appended to the annular guide wall.

22. The assembly of claim 19, [whereto] *wherein* the outer shell includes a side wall and a front wall appended to the side wall, the front wall is formed to include the nozzle-receiving opening formed in the outer shell, an interior surface facing toward the movable tank pressure control assembly, an exterior surface defining a nozzle-guiding surface terminating at the nozzle-receiving opening, and a lug appended to the interior surface to define an outer boundary of the spline-receiving space and positioned to engage the spline included in the movable tank pressure control assembly during rotation of the outer shell relative to the housing about the axis of rotation.

23. The assembly of claim 1, wherein the housing includes an inner body carrying the closure retainer apparatus and an outer body coupled to the inner body to define the interior region therebetween and formed to include the vent aperture and an outer opening receiving the movable tank pressure control assembly to permit insertion of a fuel-dispensing nozzle into the interior region of the housing through the nozzle-receiving opening.

24. The assembly of claim 23, wherein the inner body includes a cylindrical sleeve having an outer end adjacent to the movable tank pressure control assembly, an opposite inner end, and an exterior surface extending between the inner and outer ends, the closure retainer apparatus includes an annular flange appended to the exterior surface and configured to rotatably engage the filler neck, the inner body further includes a radially outwardly extending annular lip appended to the outer end of the cylindrical sleeve and having an axially inner surface facing in a first direction toward the annular flange and an axially outer surface facing in an opposite second direction, and the seal member lies around the cylindrical sleeve to abut the axially inner surface of the radially outwardly extending annular lip and the exterior surface of the cylindrical sleeve in a position lying between the annular flange and the annular lip.

25. The assembly of claim 24, wherein the movable tank pressure control assembly includes an annular seal abutting the axial outer surface of the annular lip, a pressure-relief seal plate formed to include the nozzle-receiving opening, and a spring yieldably biasing the pressure-relief seal plate to a normally closed position engaging the annular seal to block discharge of fuel vapor in the inner body through the vent aperture.

26. The assembly of claim 23, further comprising an outer shell formed to include an interior region receiving a portion of the outer body and a nozzle-receiving opening communicating with the nozzle-receiving opening formed in the movable tank pressure control assembly, the outer shell being mounted on the outer body for rotation relative to the outer body about an axis of rotation, and a torque-override mechanism engaging the outer shell and outer body and providing a torque-limited driving connection between the outer shell and outer body when the outer shell is rotated about the axis of rotation in a cap-advancing direction.

27. The assembly of claim 26, wherein the outer shell is formed to include a spline-receiving space and the movable tank pressure control assembly is formed to include a spline received in the spline-receiving space formed in the outer shell so that the movable tank pressure control assembly is keyed to rotate with the outer shell relative to the housing in response to rotation of the outer shell about the axis of rotation.

28. The assembly of claim 1, wherein the movable tank pressure control assembly includes a pressure-relief seal plate formed to include the nozzle-receiving opening formed in the movable tank pressure control assembly and a spring engaging the housing and the pressure-relief seal plate to yieldably urge the pressure-relief seal plate to a normally closed position against the housing to establish the filler neck-closing position of the movable tank pressure control assembly.

29. The assembly of claim 28, wherein the door mechanism includes a vacuum-relief valve coupled to the pressure-relief seal plate for movement between a closed position closing the nozzle-receiving opening and an open position opening the nozzle-receiving opening and a spring yieldably biasing the vacuum-relief valve to the closed position.

30. The assembly of claim 28, wherein the housing includes an exterior surface abutting the seal member and an interior surface lying in the interior region, the movable tank pressure control assembly further includes an annular seal engaging the interior surface, and the spring is configured to yieldably urge the pressure-relief seal plate against the annular seal to establish the filler neck-closing position and partition the interior region into an inner chamber positioned to communicate with the filler neck and an outer chamber communicating with the vent aperture formed in the housing.

31. The assembly of claim 30, wherein the spring is positioned to lie in the outer chamber.

32. The assembly of claim 28, further comprising an outer shell formed to include an interior region receiving a portion of the housing and a nozzle-receiving opening communicating with the nozzle-receiving opening formed in the pressure-relief seal plate, the outer shell being mounted on the housing for rotation relative to the housing about an axis of rotation, the outer shell being formed to include a spline-receiving space, and the pressure-relief seal plate including a spline received in the spline-receiving space formed in the outer shell so that the pressure-relief seal plate is keyed to rotate with the outer shell relative to the housing in response to rotation of the outer shell about the axis of rotation.

33. A filler neck closure assembly for a vehicle fuel tank filler neck, the assembly comprising a housing configured to mount in the filler neck and formed to include a sealing surface, and a pressure-relief valve positioned to lie in the housing, the pressure-relief valve including a nozzle-receiving portion and a sealing portion, the nozzle-receiving portion being formed to include a nozzle-receiving opening sized to receive a pump nozzle during refueling of the fuel tank the sealing portion being movable relative to the housing between a closure-sealing position sealingly engaging the sealing surface and a pressure-relief position away from the sealing surface to define an opening therebetween to vent fuel vapor from the fuel tank when tank pressure exceeds a predetermined maximum pressure, the nozzle-receiving portion moving axially with the sealing portion during movement of the sealing portion between the closure-sealing position and the pressure-relief position, and wherein the housing is formed to include a passageway extending therethrough and containing the pressure-relief valve therein, the housing and the pressure-relief valve cooperate to define an annular space around the pressure-relief valve and between the pressure-relief valve and the housing, and a coiled compression spring is positioned in the annular space, the pressure-relief valve includes an axially outwardly extending annular guide wall adjacent to the annular space and the guide wall defines a radially inner side of the annular space, the housing further includes a radially inwardly extending annular lip appended to the housing and the guide wall slidingly engages the lip of the housing to radially guide the pressure-relief valve during movement of the pressure-relief valve between the closure-sealing position and the pressure-relief position.

34. A filler neck closure assembly for a vehicle fuel tank filler neck, the assembly comprising a housing configured to mount in the filler neck and formed to include a sealing surface, a pressure-relief valve positioned to lie in the housing, the pressure-relief valve including a nozzle-receiving portion and a sealing portion, the nozzle-receiving portion being formed to include a nozzle-receiving opening sized to receive a pump nozzle during refueling of the fuel tank, the sealing portion being movable relative to the housing between a closure-sealing position sealingly engaging the sealing surface and a pressure-relief position away from the sealing surface to define an opening therebetween to vent fuel vapor from the fuel tank when the tank pressure exceeds a predetermined maximum pressure, the nozzle-receiving portion moving axially with the sealing portion during movement of the sealing portion between the closure-sealing position and the pressure-relief position, the housing being formed to include a passageway extending therethrough and containing the pressure-relief valve therein, the pressure-relief valve including an axially outwardly extending annular guide wall, the housing and the pressure-relief valve cooperating to define an annular space around the annular guide wall of the pressure-relief valve and between the annular guide wall and the housing the annular guide wall being adjacent to the annular space to [dating] *define* a radially inner side of the annular space, a coiled compression spring positioned to lie in the annular space and surround the annular guide wall between the sealing portion of the pressure-relief valve and the annular lip of the housing, and an outer shell rotatably connected to the housing, the outer [shall] *shell* including a plurality of axially inwardly directed drive teeth, the housing further including a plurality of driven teeth and means for biasing the driven teeth axially outwardly, the driven teeth being configured to engage the drive teeth to provide a torque-limited connection between the outer shell and the housing when the outer shell is rotated in a closure-advancing direction.

35. The assembly of claim 34, wherein the drive teeth on the outer shell are positioned to lie radially outwardly of the coiled compression spring.

36. A filler neck closure assembly for a vehicle fuel tank filler neck, the assembly comprising a housing configured to mount in the filler neck and formed to include a sealing surface, and a pressure-relief valve positioned to lie in the housing, the pressure-relief valve including a nozzle-receiving portion and a sealing portion, the nozzle-receiving portion being formed to include a nozzle-receiving opening sized to receive a pump nozzle during refueling of the fuel tank, the sealing portion being movable relative to the housing between a closure-sealing position sealingly engaging the sealing surface and a pressure-relief position away from the sealing surface to define an opening therebetween to vent fuel vapor from the fuel tank when tank pressure exceeds a predetermined maximum pressure, the nozzle-receiving portion moving axially with the sealing portion during movement of the sealing portion between the closure-sealing position and the pressure-relief position, wherein the housing is formed to include a radially inwardly extending lip appended to an axially outer portion of the housing, the filler neck closure further comprises a spring engaging the lip of the housing [mad] *and* the pressure-relief valve to yieldably bias the pressure-relief valve toward the closure-sealing position, an outer shell adjacent to an axial outer end of the housing, and a radially outwardly extending flange appended to the housing and interconnecting the outer shell and the housing, the flange including a frangible section configured to fracture in response to an impact to the outer shell leaving the housing intact to seal the filler neck, the flange being appended to the housing axially adjacent to the lip.

37. The assembly of claim 36, wherein the lip is integrally appended to an axially upper edge of the housing, the flange is formed to include a groove to define the frangible portion of the flange, and the groove is formed to lie adjacent to the radially outer edge of the lip.

38. A filler neck closure assembly for a vehicle fuel tank filler neck, the assembly comprising a housing configured to mount in the filler neck, the housing being formed to include an interior region having an outlet in fluid communication with the filler neck and a vent aperture for discharging fuel vapor extant in the interior region from the housing, an outer shell rotatably coupled to the housing, a pressure-relief valve movable relative to the housing between a closed position partitioning the interior region to define an inner chamber communicating with the outlet and an outer chamber communicating with the vent aperture and blocking the flow of fuel vapor from the inner chamber to the outer chamber and a pressure-relief position allowing the flow of fuel vapor from the inner chamber to the outer chamber to vent fuel vapor from the fuel tank through the interior region of the housing and the vent aperture formed in the housing when tank pressure exceeds a predetermined maximum pressure, and a spline interposed between the outer shell and the housing, the spline imparting rotational movement from the outer shell to the pressure-relief valve to rotate the pressure-relief valve relative to the housing in response to rotational movement of the outer shell relative to the housing, the spline blocking independent rotational movement of the outer shell relative to the pressure-relief valve.

39. The assembly of claim 38, wherein the outer shell is formed to include a spline-receiving space and the spline is appended to the pressure-relief valve and the spline is received in the spline-receiving space.

40. The assembly of claim 38, wherein the outer shell includes an axis of rotation and a front wall formed to include an outer opening sized to receive a pump nozzle during refueling of the fuel tank, the outer opening includes a first central axis coincident with the axis of rotation of the outer shell, and the pressure-relief valve is formed to include an inner opening sized to receive a pump nozzle during refueling of the fuel tank, the inner opening having a second central axis spaced apart from the first central axis.

41. The assembly of claim 40, further comprising a base positioned to lie between the filler neck and the housing, the base including an axially inner wall formed to include an unleaded discriminator opening sized to receive a pump nozzle during refueling of the fuel tank, the outer opening, the inner opening, and the unleaded discriminator opening each being positioned to receive the pump nozzle during refueling of the fuel tank.

42. The assembly of claim 38, further comprising a circular plate pivotably appended to the pressure-relief valve and movable between a closed position engaging the pressure-relief valve and a fully open position away from the pressure-relief valve, the pressure-relief valve being formed to include a nozzle-receiving opening sized to receive a pump nozzle, during refueling of the fuel tank, the circular plate covering the nozzle-receiving opening when the circular plate is in the closed position and engaging the pump nozzle when in the fully open position during refueling of the fuel tank.

43. The assembly of claim 42, further comprising a spring mounted in the housing and engaging the circular plate to yieldably bias the circular plate toward the closed position, the spring acting through the circular plate to yieldably bias the pump nozzle radially outwardly during refueling of the fuel tank.

44. A filler neck closure assembly for a vehicle fuel tank filler neck, the assembly comprising a housing configured to mount in the filler neck and formed to include an interior region and a sealing surface, a pressure-relief valve positioned to lie in the interior region of the housing, the pressure-relief valve being movable relative to the housing between a closure-sealing position sealingly engaging the sealing surface and a pressure-relief position away from the sealing surface to define an opening therebetween to vent fuel vapor from the fuel tank when tank pressure exceeds a predetermined maximum pressure, and an outer shell mounted on the housing for rotation about an axis passing through the interior region formed in the housing, the outer shell including a side wall and a front wall cooperating with the side wall to define an enclosed space receiving an axially outer portion of the pressure-relief valve when the pressure-relief valve is in the pressure-relief position.

45. The assembly of claim 44, wherein the front wall is further formed to include axially inwardly cantilevered drive teeth positioned to lie in the enclosed space of the outer shell and engaging the housing to provide a rotational driving connection between the outer shell and the housing.

46. The assembly of claim 44, wherein the front wall is further formed to include a funnel-shaped nozzle-guiding surface to guide the radial movement of the pump nozzle toward the nozzle-receiving opening as the pump nozzle advances axially toward the nozzle-receiving opening during refueling of the fuel tank.

47. The assembly of claim 44, further comprising a torque-override mechanism for providing a torque-limited connection between the outer shell and the housing so that the outer shell rotates independently of the housing upon the application of torque above a predetermined maximum torque on the outer shell, the torque-override mechanism being appended to the outer shell and the housing and positioned to lie in the enclosed space defined by the side wall and front wall of the outer shell.

48. The assembly of claim 44, wherein the pressure-relief valve is formed to include a spline, the outer shell is rotatably coupled to the housing and is formed to include a spline-receiving space, and the spline is received in the spline-receiving space so that the pressure-relief valve rotates with the outer shell relative to the housing when the outer shell rotates relative to the housing.

49. The assembly of claim 48, further comprising a flapper door and a spring engaging the flapper door to yieldably bias the flapper door against the nozzle-receiving portion to cover the nozzle-receiving opening, the flapper door being pivotably connected to the pressure-relief valve and arranged to rotate relative to the housing with the pressure-relief valve when the pressure-relief valve rotates relative to the housing in response to rotation of the outer shell relative to the housing.

50. The assembly of claim 44, further comprising a base interposed between the filler neck and the housing and a sealing gasket interposed between the base and the housing and sealingly engaging the base and the housing to block the flow of liquid fuel, fuel vapor, and air therebetween.

51. The assembly of claim 50, wherein the housing is formed to include an inner body received by the base and an outer body connected to the inner body and the outer shell is connected to the outer body.

52. The assembly of claim 51, wherein the outer body is formed to include an interior region, the inner body is formed to include an interior region in fluid communication with the interior region of the outer body, and the pressure-relief valve is received in the interior region of the outer body.

53. The assembly of claim 51, further comprising an o-ring seal mounted on the sealing surface to provide a seal between the pressure-relief valve and the inner body of the housing thereby blocking the flow of liquid fuel, fuel vapor, and air therebetween when the pressure-relief valve is in the closure-sealing position, the inner body of the housing being formed to include a radially outwardly extending annular lip having an axially outwardly facing surface including the sealing surface and engaging the o-ring seal and an axially inwardly-facing surface engaging the sealing gasket.

54. The assembly of claim 44, wherein the side wall is formed to include an axially inner edge lying in a first plane and an axially outer edge lying in a second plane that is inclined relative to the first plane.

55. The assembly of claim 54, wherein the front wall is formed to include a nozzle-receiving opening sized to receive a pump nozzle during refueling of the fuel tank and a funnel-shaped nozzle-guiding surface to guide the radial movement of the pump nozzle toward the nozzle-receiving opening as the pump nozzle advances axially toward the nozzle-receiving opening during refueling of the fuel tank.

56. A filler neck closure assembly for a vehicle fuel tank filler neck, the filler neck closure assembly comprising a housing configured to mount in the filler neck, a closure portion mounted in the housing and having an aperture for receiving a nozzle to introduce fuel into the filler neck, a plate, means for supporting the plate for movement relative to the closure portion between a closed position blocking the flow of air through the aperture means and an open position allowing the flow of air through the aperture means when the tank pressure is less than a predetermined minimum pressure, the supporting means being appended to the closure portion, a spring lying in the housing and yieldably biasing the plate against the closure portion, the spring having a spring constant such that the plate sealingly engages the closure portion when the tank pressure is above the predetermined minimum pressure and such that the plate disengages from the closure portion when tank pressure is below the predetermined minimum pressure to form an opening therebetween allowing the flow of air through the aperture means, through the opening, and into the fuel tank, the closure portion being formed to include a spline, and an outer shell rotatably connected to the housing and formed to include a spline-receiving space positioned to receive the spline so that the closure portion rotates relative to the housing with the outer shell as the outer shell rotates relative to the housing.

57. A filler neck closure assembly for a vehicle fuel tank filler neck, the filler neck closure assembly comprising a housing configured to mount in the filler neck, a closure portion mounted in the housing and having aperture means for receiving a nozzle to introduce fuel into the filler neck, a plate, means for supporting the plate for movement relative to the closure portion between a closed position blocking the flow of air through the aperture means and an open position allowing the flow of air through the aperture means when the tank pressure is less than a predetermined minimum pressure, the supporting means being appended to the closure portion, a spring lying in the housing and yieldably biasing the plate against the closure portion, the spring having a spring constant such that the plate sealingly engages the closure portion when the tank pressure is above the predetermined minimum pressure and such that the plate disengages from the closure portion when tank pressure is blow the predetermined minimum pressure to form an opening therebetween allowing the flow of air through the aperture Weans, through the opening, and into the fuel tank, the closure portion being mounted for movement relative to the housing between a closed position blocking the flow of fuel vapor between the housing and the closure portion and an open position allowing the flow of fuel vapor between the closure portion and the housing when the tank pressure is above a predetermined maximum pressure, and a compression spring yieldably biasing the closure portion toward the closed position, the compression spring having a first end engaging the closure portion, a second end engaging the housing, and the compression spring being positioned to lie axially outward of the spring yieldably biasing the plate against the closure portion.

58. A filler neck closure assembly for a vehicle fuel tank filler neck, the assembly comprising a housing configured to be received by the filler neck, a sealing gasket positioned to lie between the housing and the filler neck, the sealing gasket being subject to damage due to overtightening of the closure assembly on the filler neck, an outer shell rotatably connected to the housing, the outer shell being formed to include a nozzle-receiving opening, and a torque-override mechanism for providing a torque-limited connection between the outer shell and the housing to protect the gasket from over tightening of the closure assembly on the filler neck resulting from the application of torque above a predetermined maximum torque on the outer shell, the torque-override mechanism including drive teeth appended to the outer shell.

59. The assembly of claim 58, further comprising a base disposed in the filler neck between the filler neck and the housing, the base being formed to include a mouth having a lip arranged to engage the sealing gasket and an axially inner wall having an unleaded discriminator.

60. The assembly of claim 58, wherein the torque-override mechanism further includes a flange appended to the housing, the flange having a plurality of driven teeth and a spring for yieldably biasing the driven teeth axially outwardly, and the driven teeth are configured to engage the drive teeth.

61. The assembly of claim 60, wherein the spring includes resilient fingers connected to the flange and cantilevered therefrom and the driven teeth are appended to the resilient fingers.

62. The assembly of claim 58, wherein the drive teeth are spaced apart along a generally circular path that is positioned to lie radially outwardly of the sealing gasket.

63. The assembly of claim 58, wherein the outer shell is formed to include a front wall arranged to define a generally funnel-shaped nozzle-guiding surface terminating at the nozzle-receiving opening.

64. The assembly of claim 63, further comprising a latching portion integrally appended to the front wall and positioned to engage the pump nozzle during refueling of the fuel tank to prevent inadvertent axial movement of the pump nozzle out of the nozzle-receiving opening.

65. The assembly of claim 58, wherein the outer shell is formed to include a front wall arranged to define a generally planar boot-seating surface adjacent to the nozzle-receiving opening.

*66. A self-closing cap adapted to be mounted onto a filler neck of a fuel tank of an automotive vehicle wherein said neck includes a restrictive flap pivotally connected thereto, comprising:*

*a closure ring having an annular body and means for detachably mounting the periphery of said annular body around a peripheral edge of a filler neck,*

*a closure flap assembly including a circular member having an opening for receiving a nozzle, a closure flap, means for pivotally mounting an edge of said closure flap over said opening, and means for affixing said circular member to said annular body such that the orientation of said pivotal mounting means is adjustable relative to a pivotal connection between said restrictive flap and said neck, and*

*a cover means detachably mountable over said closure flap assembly.*

*67. The self-closing cap as defined in claim 66, wherein said closure flap is spring biased over said opening in said circular member.*

*68. The self-closing cap as defined in claim 66, wherein said means for affixing said circular member to said annular body includes a ratchet lock mechanism.*

*69. The self-closing cap as defined in claim 66, wherein said cover means includes a port for receiving a nozzle and a guide face for guiding said nozzle into said port.*

*70. The self-closing cap as defined in claim 69, wherein said guide face is inclined with respect to said circular member of said closure flap assembly to facilitate the guiding of said nozzle into said port.*

*71. The self-closing cap as defined in claim 70, wherein said filler neck is inclined at an oblique angle with respect to an adjacent wall of said vehicle, and said inclination of said guide face orients said face at an angle that facilitates the insertion of a fuel nozzle from an automatic filling machine.*

*72. The self-closing cap as defined in claim 69, wherein said cover means includes means for guiding the nozzle of an automatic fuel-dispensing machine.*

*73. A self-closing cap for attachment to the fuel filler neck of a vehicle that is particularly adapted for use with an automatic filling machine, said neck having a restrictive flap within its inner diameter that is connected thereto by a pivotal connection, comprising:*

*a closure ring having an annular body and means for detachably mounting the periphery of said annular body around the periphery of a filler neck,*

*a closure flap assembly including a circular member having an opening, a closure flap, means for pivotally mounting said closure flap over said opening, and means for affixing said circular member at a selected position with respect to the periphery of said annular body of said closure ring after said ring has been mounted around the periphery of said filler neck such that the orientation of said pivotal mounting means is angularly adjustable relative to said annular body to a position substantially* 180° opposite from said pivotal connection of said restrictive flap, and

*a cover means detachably mountable over said closure flap assembly.*

*74. The self-closing cap as defined in claim 73, wherein both said restrictive flap and said closure flap are spring biased over said neck inner diameter and opening, respectively, and wherein said 180° orientation between said pivotal connection and said pivotal mounting means facilitates the insertion and withdrawal of a fuel dispensing nozzle from an automatic filling machine through said cap and filler neck.*

*75. The self-closing cap as defined in claim 73, wherein said affixing means includes a ratchet lock mechanism.*

*76. The self-closing cap as defined in claim 73, wherein said cover means includes a port for receiving a fuel nozzle, and a guide face for guiding said nozzle into said port.*

*77. The self-closing cap as defined in claim 76, wherein said guide face is inclined with respect to said circular member of said closure flap assembly to facilitate the guiding of said fuel nozzle into said port.*

*78. The self-closing cap as defined in claim 77, wherein said filler neck is inclined at an oblique angle with respect to an adjacent wall of said vehicle, and said inclination of said guide face facilitates the insertion of said fuel nozzle into said port and through said opening.*

*79. The self-closing cap as defined in claim 77, wherein said cover means includes means for guiding the nozzle of an automatic fuel dispensing machine.*

*80. A self-closing cap adapted to be mounted onto a filler neck of a fuel tank of an automotive vehicle, comprising:*

*a closure ring having an annular body and means for detachably mounting the periphery of said annular body around a peripheral edge of a filler neck, and*

*a closure flap assembly including a circular member having an opening for receiving a nozzle, a closure flap, means for pivotally mounting an edge of said closure flap over said opening, and means for permanently affixing said circular member to said annular body such that the orientation of said pivotal mounting means is angularly adjustable relative to said annular body, and*

*a cover means detachably mountable over said closure flap assembly.*

* * * * *